US00RE36500E

United States Patent [19]

Ando et al.

[11] E Patent Number: Re. 36,500

[45] Reissued Date of Patent: Jan. 18, 2000

[54] INTERNAL COMBUSTION ENGINE

[75] Inventors: Hiromitsu Ando, Okazaki; Jun Takemura, Toyota; Kazuyoshi Nakane, Okazaki; Tetsuji Saeki, Kyoto, all of Japan

[73] Assignee: Mitsubishi Jidosha Kogyo Kabushiki Kaisha, Tokyo, Japan

[21] Appl. No.: 08/637,528

[22] Filed: Apr. 25, 1996

Related U.S. Patent Documents

Reissue of:

[64] Patent No.: 5,305,720
Issued: Apr. 26, 1994
Appl. No.: 08/022,630
Filed: Feb. 25, 1993

[30] Foreign Application Priority Data

| | | | |
|---|---|---|---|
| Feb. 28, 1992 | [JP] | Japan | 4-044006 |
| Feb. 28, 1992 | [JP] | Japan | 4-044008 |
| Feb. 28, 1992 | [JP] | Japan | 4-044009 |
| Nov. 4, 1992 | [JP] | Japan | 4-295320 |
| Nov. 4, 1992 | [JP] | Japan | 4-295321 |

[51] Int. Cl.[7] ..... F02B 23/00

[52] U.S. Cl. ..... 123/193.4; 123/193.6; 123/568

[58] Field of Search ..... 123/301, 294, 123/188.14, 188.4, 306, 184.29, 184.42, 184.47, 193.1, 193.6, 193.4, 568, 90.1

[56] References Cited

U.S. PATENT DOCUMENTS

| | | | |
|---|---|---|---|
| 3,494,336 | 2/1970 | Myers et al. | 123/188.14 |
| 3,973,548 | 8/1976 | Celli | 123/90.1 |
| 4,026,250 | 5/1977 | Funiciello . | |
| 4,162,662 | 7/1979 | Melchior . | |
| 4,164,209 | 8/1979 | Brants | 123/188.4 |
| 4,300,499 | 11/1981 | Nakanishi et al. . | |
| 4,522,173 | 6/1985 | Agache . | |
| 4,745,891 | 5/1988 | Cola . | |
| 4,798,183 | 1/1989 | Hataura et al. . | |
| 4,854,291 | 8/1989 | Elsbett et al. | 123/568 |
| 5,020,485 | 6/1991 | Watanabe . | |
| 5,056,309 | 10/1991 | Linder et al. | 123/568 |
| 5,109,816 | 5/1992 | Sasaki . | |
| 5,115,774 | 5/1992 | Nomura et al. . | |
| 5,115,776 | 5/1992 | Ohno et al. . | |
| 5,127,379 | 7/1992 | Kobayashi et al. . | |

FOREIGN PATENT DOCUMENTS

| | | |
|---|---|---|
| 0 431 866 | 6/1991 | European Pat. Off. . |
| 0 432 950 | 6/1991 | European Pat. Off. . |
| 0 464 622 | 1/1992 | European Pat. Off. . |
| 0 496 029 | 7/1992 | European Pat. Off. . |
| 26 39 194 | 3/1978 | Germany . |
| 27 51 993 | 5/1979 | Germany . |
| 40 12 492 | 10/1990 | Germany . |
| 61-20698 | 5/1986 | Japan . |
| 63-113748 | 7/1988 | Japan . |
| 3-96651 | 4/1991 | Japan . |

(List continued on next page.)

*Primary Examiner*—Marguerite McMahon
*Attorney, Agent, or Firm*—Evenson, McKeown, Edwards & Lenahan, PLLC

[57] ABSTRACT

A vertical vortex, namely, a reverse tumble flow is formed inside a cylinder of an internal combustion engine to form an intake air flow for smooth intake and exhaust in the internal combustion engine and also to promote atomization of fuel and mixing of air and fuel in a combustion chamber. To form this reverse tumble flow, a downstream portion of an intake passage is formed extending toward a central axis of the cylinder. To promote the formation of the swirl and further to form the combustion chamber as an efficient compact combustion chamber, a recessed portion is formed in a top wall of a piston. The top wall of the piston is provided with a raised portion at a location adjacent to the recessed portion, whereby, in the vicinity of top dead center of the piston, a squish is produced in a direction flowing toward a side of a spark plug in the efficient combustion chamber. Under cooperation with the reverse tumble flow, the squish serves to have a rich air-fuel mixture centered around the spark plug upon lean burn.

25 Claims, 17 Drawing Sheets

FOREIGN PATENT DOCUMENTS

| | | |
|---|---|---|
| 3-52333 | 5/1991 | Japan . |
| 4-6535 | 1/1992 | Japan . |
| 4-58030 | 2/1992 | Japan . |
| 4-112944 | 4/1992 | Japan . |
| 4-166612 | 6/1992 | Japan . |
| 357519 | 9/1931 | United Kingdom . |
| 2 049 811 | 12/1980 | United Kingdom . |

PORT SHROUD A

PORT SHROUD B

INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

1) Field of the Invention

This invention relates to an internal combustion engine of the type that an intake air flow inducted through an intake port into a cylinder is formed into a swirl and an air-fuel mixture so swirling is then caused to burn.

2) Description of the Related Art

In general, a main body of a reciprocal internal combustion engine is primarily constructed of a cylinder head, a cylinder block and a crankcase. Received inside these elements are at least one cylinder with a piston fitted therein, an intake passage and exhaust passage communicable via an intake valve and an exhaust valve to a combustion chamber formed in an upper part of the cylinder, a valve system for driving the intake valve and the exhaust valve, a connecting rod for converting a reciprocal motion of the piston into a rotational motion and transmitting the latter to a crankshaft, etc.

In such an internal combustion engine, intake air inducted in a cylinder during an intake stroke is fed with fuel in an amount corresponding to the amount of the inducted air so that combustion energy is produced. This energy is received by a piston and, after converted to rotational energy, is outputted.

Depending on the manner of ignition for combustion, these internal combustion engines can be classified into diesel engines and the like, as compression-ignition internal combustion engines, and gasoline engines as spark-ignition internal engines. Depending on the engine strokes, on the other hand, they can also be classified into 2-cycle engines and 4-cycle engines.

Irrespective of the type of an internal combustion engine, the internal combustion engine is required to show fast operation responsibility and, while retaining good combustion stability, to be improved in combustion efficiency so that it can provide a sufficient output at low fuel consumption.

To improve the combustion efficiency of an internal combustion engine, it is effective to promote atomization of fuel and also mixing of the fuel and air in a combustion chamber. Proposals have hence been made as to the configuration of a top wall of a piston or a lower wall of a cylinder head, said top wall and lower wall forming a combustion chamber. It has also been proposed to design the manner of feeding of fuel in accordance with the configuration of the combustion chamber. Further proposals have also been made regarding the position of a spark plug.

For example, Japanese Utility Model Application Laid-Open (Kokai) No. HEI 3-52333 discloses an internal combustion engine of the cylinder injection type having an intake valve and exhaust valve in a cylinder head. With a view to achieving good scavenging effect even during low-load operation, good mixing of burnt gas and atomized fuel during high-load operation, and good combustion over a wide load range, the following construction is proposed there.

An intake opening of the cylinder head is provided with a mask for closing the intake opening on a side of the exhaust valve while the intake valve is opened. A top wall of a piston is provided with a raised portion on the side of the exhaust valve and also with a recessed portion on a side of the intake valve. A flow of inducted air is accordingly guided in such a way that the inducted air descends from the intake opening along an inner wall of the cylinder on the side of the intake valve, flows to the side of the exhaust valve along the top wall of the piston and then ascends along the inner wall of the cylinder on the side of the exhaust valve, so that a so-called vertical vortex is formed. A fresh air flow is therefore ensured to have a sufficient flow velocity in an attempt to provide sufficient scavenging effect even during low-load operation.

In addition, a squish is produced at the raised portion on the top wall of the piston so that the mixing of burnt gas and a spray of fuel is promoted to achieve good combustion even during high-load operation.

Further, Japanese Patent Application Laid-Open (Kokai) No. He 4-58030 discloses a spark-ignition internal combustion engine of the cylinder injection type. It is proposed to form a recessed portion on a side of intake valves in a top wall of a piston and to ignite fuel, which has been injected into the recessed portion, by ignition means. Another proposal is made there with respect to the timing of the above ignition.

Japanese Patent Application Laid-Open (Kokai) No. HEI 4-6535, on the other hand, discloses a spark-ignition internal combustion engine of the cylinder injection type. It is proposed to form a top wall of a piston with a deep dish portion, which corresponds to the recessed portion described above, and a shallow dish portion located around the deep dish portion and further to form a bottom of the shallow dish portion into an upwardly convex surface. Fuel, which has been injected toward the shallow dish portion, is caused to widely spread in to a thin layer along the upwardly convex surface. As a result, evaporation of the fuel is promoted, so that production of smoke is reduced and a uniform air-fuel mixture is formed over a wide range to reduce knocking.

If the area of the shallow dish portion is enlarged with a view toward improving combustion during high-load operation, in other words, the velocity of evaporation of fuel, the injected fuel enters the shallow dish portion and spreads too much in the shallow dish portion during medium-load operation. This makes it difficult to allow a flame to propagate from the deep shallow portion, leading to the problem that combustion is impaired and HC is produced. To overcome this problem, the following construction is proposed in U.S. Pat. No. 5,109,816.

An outer edge portion is formed between the deep dish portion and the shallow dish portion located around the deep dish portion, with an edge portion interposed between the outer edge portion and the deep dish portion. During medium-load operation, fuel is injected in such a way that the fuel so injected hits the edge portion between a fuel-evaporating groove in the deep dish portion and the outer edge portion. After hitting the edge portion, the fuel is divided into two parts, one being on a side of the fuel-evaporating groove and on a side of the outer edge portion, as thin liquid layers. The evaporation of the fuel is therefore promoted, thereby preventing production of smoke which may occur due to localized over-enrichment of fuel. The liquid layer formed inside the fuel-evaporating groove is caused to evaporate by a swirl, whereby an air-fuel mixture to be ignited is formed near a spark plug. Evaporation of the liquid layer at the outer edge portion is promoted because the liquid layer is thin. Further, the liquid layer at the outer edge portion is prevented from over-flowing to the side of the shallow dish portion by a side wall of the outer edge portion. As a result, an air-fuel mixture of an appropriate fuel concentration is formed inside the outer edge portion, thereby ensuring propagation of a flame from the deep dish portion to the outer edge portion and further to the shallow dish portion.

To cause an air-fuel mixture to center around a spark plug in a cylinder-injection, internal combustion engine making use of an air blast valve, the following construction is proposed, for example, in U.S. Pat. No. 5,115,774.

A groove is formed in a top wall of a piston. During a latter part of a compression stroke, fuel is injected together with compressed air from the air blast valve toward the groove. The width of the groove as measured in a direction perpendicular to the direction of injection of the fuel is narrower than the longitudinal width of the groove and both side walls defining the transverse width of the groove are located slightly outside a range of the fuel so injected. The injected fuel is therefore prevented from spreading sidewards, whereby the air-fuel mixture is allowed to center around the spark plug.

To prevent injected fuel from directly hitting an inner wall of a cylinder and hence to avoid seizure of a piston in a cylinder-injection internal combustion engine, the following construction is proposed, for example, in U.S. Pat. No. 5,115,776.

A groove is formed in a top wall of a piston and fuel is injected toward the groove. Described specifically, two fuel injection valves are provided, one directing exactly toward the groove when the position of the piston is high and the other directly precisely toward the groove when the position of the piston is low, whereby the fuel can be injected toward a center of the groove irrespective of the position of the piston.

To form a combustible air-fuel mixture around a spark plug with a small injection amount of the fuel in a cylinder-injection, internal combustion engine, the following construction is proposed, for example, in U.S. Pat. No. 5,127,379.

In a top wall of a piston, a groove is formed extending from a point below a spark plug to another point below a fuel injection valve. In spark-plug-side parts of walls of the groove, arcuate stepped portions are formed, respectively. The fuel, which has been injected toward the walls of the groove from the fuel injection valve, is therefore guided by the walls of the grooves so that the fuel is allowed to center around the spark plug. At this time, the fuel stuck on the walls of the groove is allowed to evaporate and center around the spark plug while being separated from the walls of the groove.

In each of the conventional examples described above, a dimensional reduction of a combustion chamber has been achieved by forming a recessed portion only in a part of a top wall of a piston. Such a combustion chamber will hereinafter be called an "eccentric combustion chamber". This compact combustion chamber is a means for improved combustion. In this sense, each conventional example can be said to be a representative engines in which a certain improvement has been made in combustion. If a further improvement in combustion is desired, effective formation of a swirl inside a combustion chamber is indispensable. Upon formation of such a swirl inside a combustion chamber, it is necessary to suitably design not only the configuration of a top wall of a piston but also the configuration of an intake port through which intake air is fed to the combustion chamber (and, if necessary, the configuration of an intake passage communicating to an upstream end of the intake port). It is particularly preferred to employ such a construction that the top wall of the piston and the intake port can cooperated with each other to enhance a swirl. Regarding an eccentric combustion chamber capable of achieving a compact combustion chamber, the top wall of its piston is, as disclosed in Japanese Utility Model Application Laid-Open (Kokai) No. HEI 3-52333, is formed in a configuration suited for the formation of a vertical swirl in a downward direction, that is, toward the top wall of the piston on an intake side inside the combustion chamber.

According to the structure of the intake port disclosed in each of the conventional examples described above, it receives at the upstream side thereof intake air from the intake-side side wall of the cylinder head and is suddenly bent downwardly in the cylinder head to introduce the intake air into the combustion chamber. Such an intake port structure cannot provide the intake air flow, which has been introduced into the combustion chamber, with any sufficient downward flow component, thereby making it difficult to sufficiently form the above-described vertical swirl.

Paying particular attention to an internal combustion engine of the cylinder injection type, an injector is mounted on a cylinder head in such a way that the injector is oriented directly toward a combustion chamber. Taking into consideration the requirement that a main body of the injector and the fuel fed through the injector should be kept apart from heat, it is desired to arrange the injector at a position as remote as possible from the side of an exhaust port which becomes hot. With the construction that a passage extending from an intake port opens through a side wall of a cylinder head, however, it is often difficult to adopt the above-described arrangement.

In the case of an internal combustion engine of the spark ignition type, it may be contemplated to achieve so-called lean burn and hence to improve the combustion efficiency by causing a rich air-fuel mixture to partly gather a spark plug. In this case, it is necessary to arrange an injector so that fuel can be injected toward the spark plug. With the construction that a passage extending from an intake port opens through a side wall of a cylinder head, however, it is often difficult to adopt the above-described arrangement.

Multi-valve engines, led by 4-valve engines in which each cylinder is provided with two intake valves and two exhaust valves, have become popular especially in recent years. In such a multi-valve engine, the spaces around its intake and exhaust passages become narrower so that a still more stringent limitation is imposed on the space for the arrangement of the individual parts described above. This makes it more difficult to arrange the individual parts at optimal positions, respectively.

To efficiently perform combustion with a small amount of fuel under lead burn conditions, it is more effective to form a compact combustion chamber and to make a rich air-fuel mixture gather in part near a spark plug so that combustion is achieved.

When a reduction in fuel consumption is achieved especially by lean burn, it is impossible to substantially reduce NOx (nitrogen oxides) contained in exhaust gas despite the use of a lean air-fuel mixture. It is hence contemplated to add an exhaust gas recirculation system (hereinafter called the "EGR system") in which a part of exhaust gas is caused to flow into an intake pipe and is burned again to reduce the amount of NOx. In particular, a cylinder-injection, internal combustion engine is generally suited for an EGR system so that the amount of NOx can be reduced by a large volume of EGR gas.

In a lean-burn, internal combustion engine, it is general that the intake pressure is high and the difference between the intake pressure and the exhaust pressure is small. It is therefore difficult to feed sufficient EGR gas to each intake port, resulting in the problem that the EGR gas cannot be provided with any sufficient flow rate.

Especially, a long EGR passage leads to a lower EGR gas temperature and also to smaller EGR gas flow rate due to flow resistance.

SUMMARY OF THE INVENTION

An object of the present invention is to permit formation of a sufficient, vertical swirl inside a cylinder of an internal combustion engine without failure so that smooth intake and exhaust can be performed in the internal combustion engine and atomization of fuel and mixing of the fuel and air in a combustion chamber can be promoted.

Another object of the present invention is to make it possible to arrange an injector, a spark plug and the like in adequate positions at appropriate positions around an intake passage and exhaust passage of a cylinder block, for example, to arrange the injector in such a way that fuel can be injected toward the spark plug.

A further object of the present invention is to sufficiently enlarge an intake passage and exhaust passage so that a sufficient volumetric efficiency can be achieved.

A still further object of the present invention is to form a compact combustion chamber so that efficient and stable combustion can be conducted as lean burn with a smaller amount of fuel.

A still further object of the present invention is to assure a sufficient flow rate for EGR gas and to avoid a temperature drop in EGR gas in a lean burn engine so that the amount of NOx in exhaust gas can be substantially reduced in a lean burn region.

A still further object of the present invention is to make it possible to control the flow rate of EGR gas to be distributed to each cylinder independently from those of EGR gas to be distributed to the other cylinders.

In one aspect of the present invention, there is thus provided an internal combustion engine having:

a combustion chamber formed between a top wall of a piston fitted in a cylinder and a lower wall of a cylinder head, an intake port formed through the cylinder head on one side of a reference plane in which a cylinder axis as a central axis of the cylinder is contained, said intake port communicating through an intake opening with the combustion chamber, an exhaust port formed through the cylinder head on an opposite side of the reference plane, said exhaust port communicating through an exhaust opening with the combustion chamber, and open/close valves disposed in the intake port and the exhaust port, respectively, the improvement wherein:

the intake port is formed extending from the intake opening toward an upstream side of the intake port along the cylinder axis; and the piston is provided at the top wall thereof with a recessed portion and a raised portion, said recessed portion being formed at a location off-set toward said one side to guide an intake air flow, which has been inducted into the combustion chamber, as a swirl about an axis extending in parallel with a line which in turn extends at a right angle relative to the cylinder axis, and said raised portion being formed on the opposite side to extend in continuation with an upwardly gently sloping edge portion of the recessed portion, whereby the raised portion approaches the lower wall of the cylinder head at top dead center of the piston.

Preferably, fuel injection means is disposed on a side of the intake port through a side wall of the cylinder head, whereby said fuel injection means faces the combustion chamber. The intake port can be wider on a side remote from the cylinder axis than on a side close to the cylinder axis. An intake pipe communicating with an upstream end of the intake port is preferably formed extending from an upper wall of the cylinder head toward the opposite side so that an intake passage portion formed of the intake pipe and the intake port is smoothly curved. Exhaust passage constituting means communicating with the exhaust port can be formed extending through the cylinder head toward the opposite side, an exhaust gas recirculation passage is arranged to connect the intake pipe to said exhaust passage constituting means, and an exhaust gas recirculation valve is inserted in the exhaust gas recirculation passage.

An upstream portion of the intake port in the cylinder head can be curved toward an upper portion of the exhaust port on the opposite side, an exhaust gas recirculation passage is arranged in the cylinder head to connect the intake port to the exhaust port, and an exhaust gas recirculation valve is inserted in the exhaust gas recirculation passage. The intake port is desirably wider on a side remote from the cylinder axis than on a side close to the cylinder axis.

An intake pipe communicating with the intake port can be formed extending from an upper wall of the cylinder head toward the opposite side so that an intake passage portion formed of the intake pipe and an upstream side of the intake port is smoothly curved. Preferably, exhaust passage constituting means communicating with the exhaust port is formed extending toward the opposite side through the cylinder head, an exhaust gas recirculation passage is arranged to connect the intake pipe to said exhaust passage constituting means, and an exhaust gas recirculation valve is inserted in the exhaust gas recirculation passage.

Desirably, an intake pipe communicating with the intake port is formed extending from an upper wall of the cylinder head toward the opposite side, exhaust passage constituting means communicating with the exhaust port is formed extending toward the opposite side through the cylinder head, an exhaust gas recirculation passage is arranged to connect the intake pipe to said exhaust passage constituting means, and an exhaust gas recirculation valve is inserted in the exhaust gas recirculation passage. The internal combustion engine can be a multi-cylinder internal combustion engine and each cylinder can be provided individually with the exhaust gas recirculation passage.

The internal combustion engine may further comprises spark ignition means on the lower wall of the cylinder head. The spark ignition means being arranged centrally in an upper part of the combustion chamber so that said spark ignition means extends along the cylinder axis. Preferably, said fuel injection means is arranged to inject fuel toward the recessed portion formed in the top wall of the piston. Said fuel injection means can be set to perform injection of fuel during a latter part of a compression stroke while the engine is operated under a low load and the engine is set to conduct combustion as lean burn. Desirably, said fuel injection means is set in such a manner that fuel is injected during a latter part of a compression stroke of the engine to conduct combustion as lean burn while the engine is operated under a low load but fuel is injected during an intake stroke of the engine to conduct combustion at a air-fuel ratio higher than that for the lean burn while the engine is operated under a high load.

The intake port can be wider on a side remote from the cylinder axis than on a side close to the cylinder axis and the engine is set to conduct combustion as lean burn. Preferably, an intake pipe communicating with the intake port is formed extending from an upper wall of the cylinder head toward the opposite side so that an intake passage portion formed of the intake pipe and an upstream side of the intake port is smoothly curved. Desirably, exhaust passage constituting means communicating with the exhaust port is formed extending toward the opposite side through the cylinder head, an exhaust gas recirculation passage is arranged to connect the intake pipe to said exhaust passage constituting means, and an exhaust gas recirculation valve is inserted in the exhaust gas recirculation passage.

The engine can be set to conduct combustion as lean burn, and an intake pipe communicating with the intake port can be formed extending from an upper wall of the cylinder head toward the opposite side so that an intake passage portion formed of the intake pipe and an upstream side of the intake port is smoothly curved. Preferably, exhaust passage constituting means communicating with the exhaust port is formed extending toward the opposite side through the cylinder head, an exhaust gas recirculation passage is arranged to connect the intake pipe to said exhaust passage constituting means, and an exhaust gas recirculation valve is inserted in the exhaust gas recirculation passage.

Preferably, the engine is set to conduct combustion as lean burn, an intake pipe communicating with the intake port is formed extending from an upper wall of the cylinder head toward the opposite side, exhaust passage constituting means communicating with the exhaust port is formed extending toward the opposite side through the cylinder head, an exhaust gas recirculation passage is arranged to connect the intake pipe to said exhaust passage constituting means, and an exhaust gas recirculation valve is inserted in the exhaust gas recirculation passage.

The present invention can achieve the above objects of the present invention.

BRIEF DESCRIPTION OF THE DRAWINGS

The above and other objects, features and advantages of the present invention will become apparent from the following description and the appended claims, taken in conjunction with the accompanying drawings, in which:

FIGS. 4(a) through 4(d) illustrate open/close states of a control valve of an exhaust gas recirculation system in the cylinder-injection, internal combustion engine according to the first embodiment of the present invention, in which FIGS. 4(a) and 4(c) are views taken from a side of an EGR passage while FIGS. 4(b) and 4(d) are enlarged views of a part G in FIG. 3;

DETAILED DESCRIPTION OF THE INVENTION AND PREFERRED EMBODIMENTS

A description will first be made of the first embodiment of the present invention.

Figure 1:
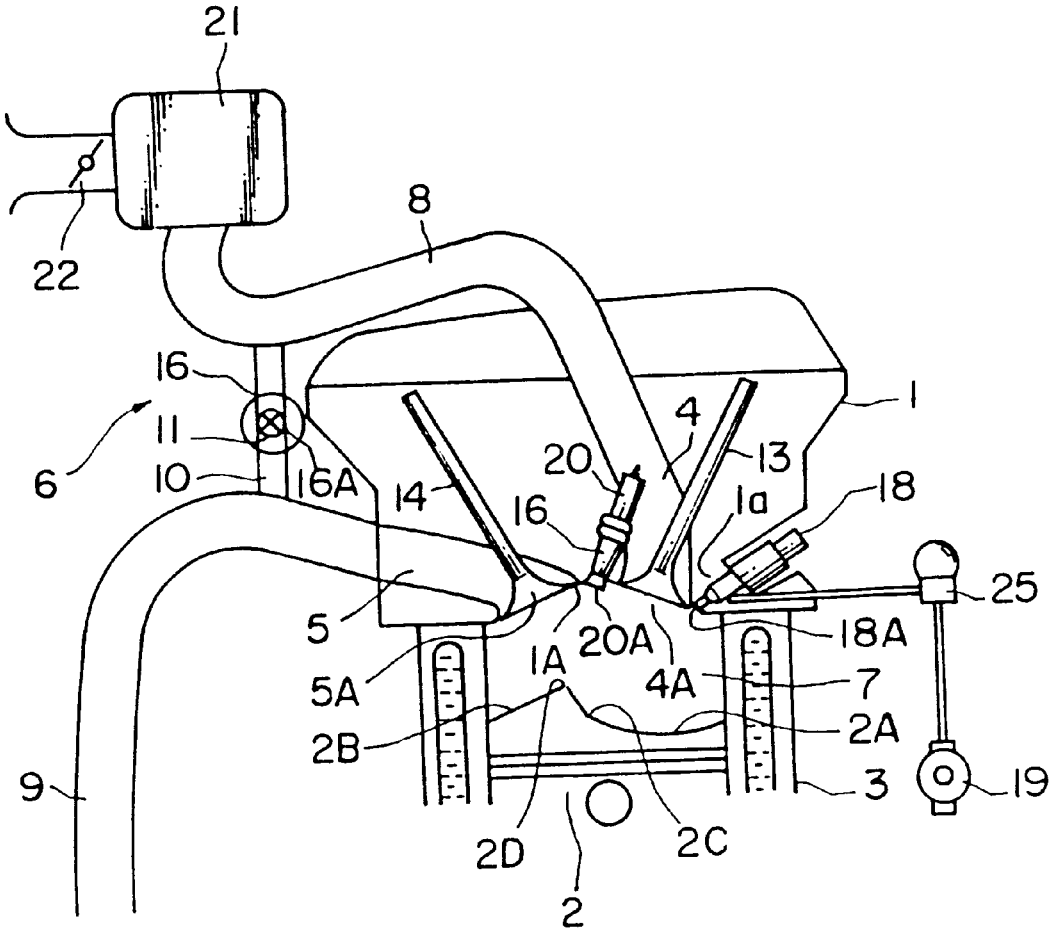
FIG. 1 is a schematic view illustrating the overall internal construction of a cylinder-injection, internal combustion engine according to a first embodiment of the present invention.
Figure 2:
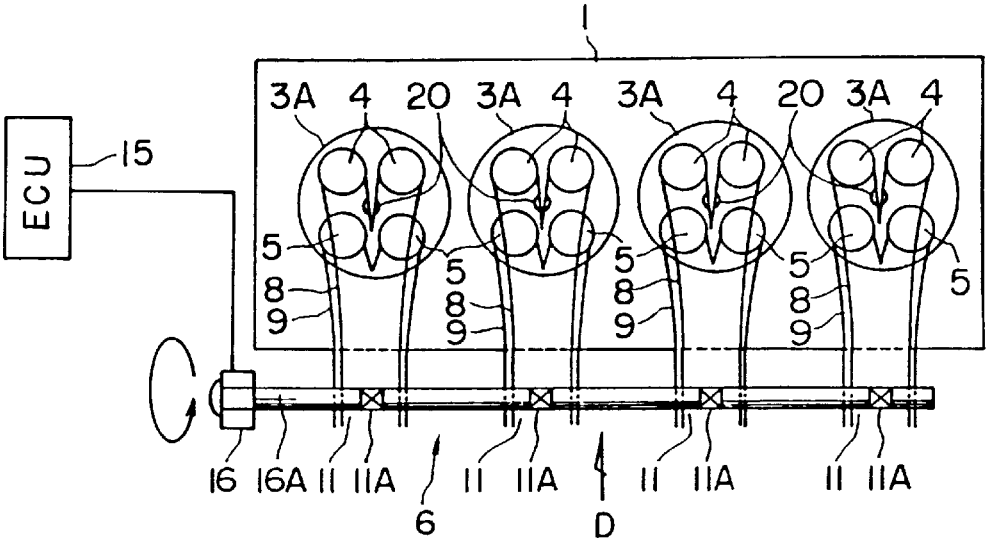
FIG. 2 is a schematic top plan view of a cylinder head in the cylinder-injection, internal combustion engine according to the first embodiment of the present invention.
Figure 5:
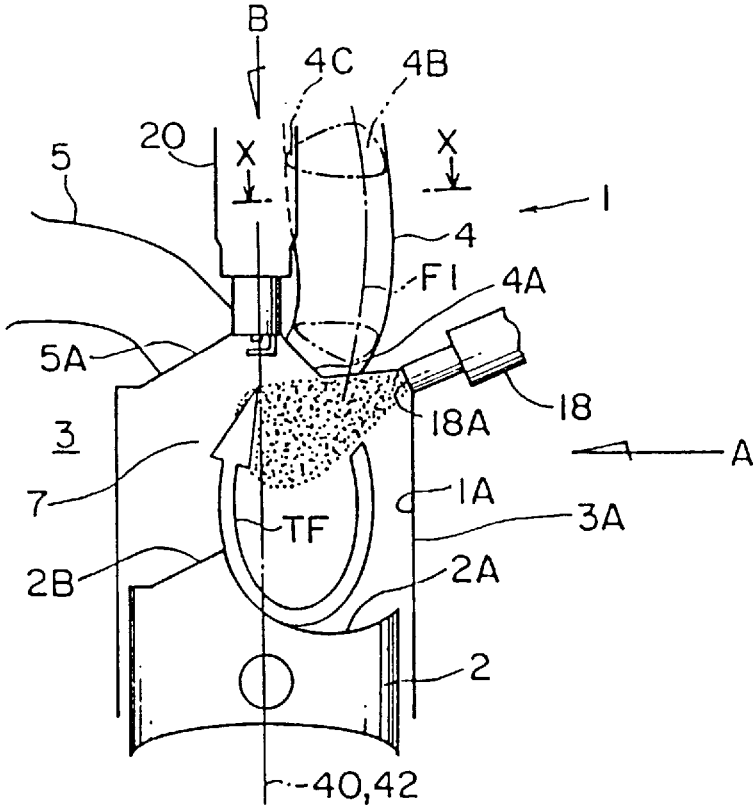
FIG. 5 is an overall view schematically illustrating the internal construction of the cylinder-injection, internal combustion engine according to the first embodiment of the present invention.

Needless to say, the internal combustion according to the present embodiment is of the reciprocal type and as shown in FIGS. 1 and 5, is a cylinder-injection, internal combustion engine in which fuel is injected directly into a cylinder 3A from an injector 18.

A main body of this cylinder-injection, internal combustion engine (hereinafter called the "internal combustion engine" or the "engine" for the sake of brevity) is primarily formed of a cylinder head I, a cylinder block 3 and an unillustrated crankcase. Inside the cylinder head 1 and the cylinder block 3, the cylinder 3A is formed. A piston 2 is fitted in the cylinder 3A. A reciprocal motion of the piston is converted to a rotational motion and is transmitted to an unillustrated crankshaft via a connecting rod (not shown).

In the cylinder 3A, a combustion chamber 7 is formed between a top wall of the piston 2 and a lower wall of the cylinder head 1. Further, the cylinder head 1 is provided with an intake port 4 and an exhaust port 5 so that the intake port 4 and the exhaust port 5 are communicated with the cylinder 3A. The intake port 4 forms an intake passage while the exhaust port 5 forms an exhaust passage. The intake port 4 and exhaust port 5 are arranged with an imaginary plane 40 interposed therebetween, said imaginary plane 40 containing a cylinder axis 42 as a central axis of the cylinder 3A (hereinafter called the "reference plane"). Accordingly, the intake port 4 is disposed on one side of the reference plane 40 while the exhaust port 5 is arranged on the opposite side of the reference plane.

Inside openings 4A,5A of these intake and exhaust ports 4,5 to the combustion chamber, open/close valves, namely, an intake valve 13 and an exhaust valve 14 are arranged as illustrated in FIG. 1. The openings 4A,5A to the combustion chamber are opened or closed by the intake and exhaust valves 13,14, respectively. Incidentally, the internal combustion engine is a 4-cylinder internal combustion engine and is constructed as a 4-valve internal combustion engine in which the cylinder head 1 is provided with two intake valves and two exhaust valves per cylinder.

Figure 6:
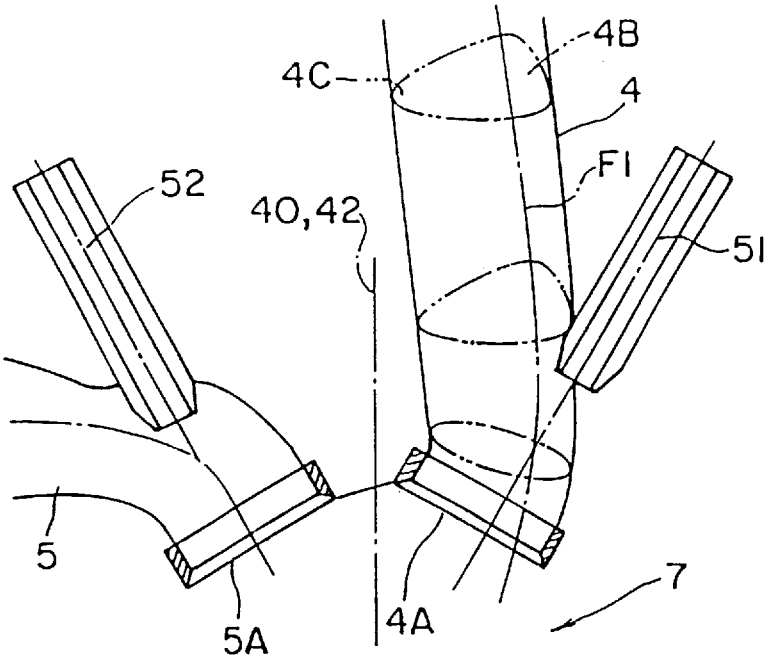
FIG. 6 is a schematic view showing an intake port and an exhaust port in the cylinder-injection, internal combustion engine according to the first embodiment of the present invention and is an enlarged fragmentary view of an intake port in FIG. 5.
Figure 7:
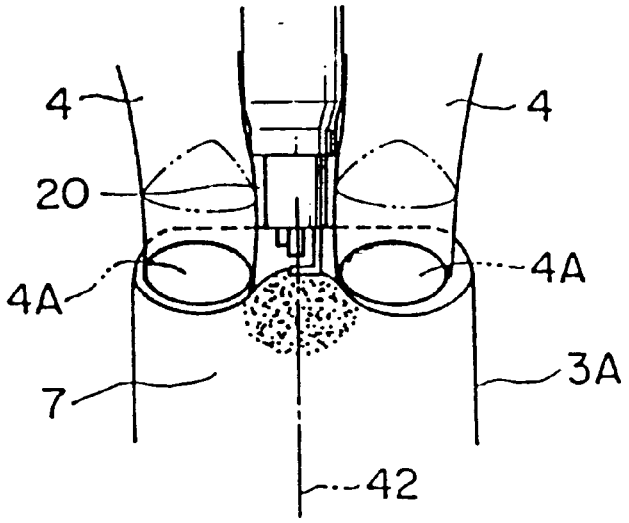
FIG. 7 is a schematic view showing the intake port in the cylinder-injection, internal combustion engine according to the first embodiment of the present invention, as viewed in the direction of arrow A in FIG. 5.

Numerals 51,52 in FIG. 6 indicate axes of valve stems of the intake and exhaust valves 13,14.

To an upstream side of the intake port 4, an intake manifold 8 as an intake pipe is communicated and connected to form an intake passage. Likewise, an exhaust manifold 9 as an exhaust passage constituting means is communicated and connected to a downstream side of the exhaust port 5 to form an exhaust passage.

In the illustrated embodiment, the upstream side of the intake port 4 is open through an upper part of the cylinder head 1 and the intake manifold 8 is connected to this opening in the upper part of the cylinder head 1. An intake passage portion formed of the intake port 4 and the intake manifold 8 is formed so that it curves smoothly.

As is illustrated in FIG. 1, a surge tank 21 and throttle valve 22 are arranged on the upstream side of the intake manifold 8. Air is inducted with its flow rate being controlled in accordance with the opening of the throttle valve 22. The air is fed to the intake manifold 8 of each cylinder via the surge tank 21. Incidentally, a plenum chamber with a built-in inter cooler can be disposed instead of the surge tank 21.

Figure 3:
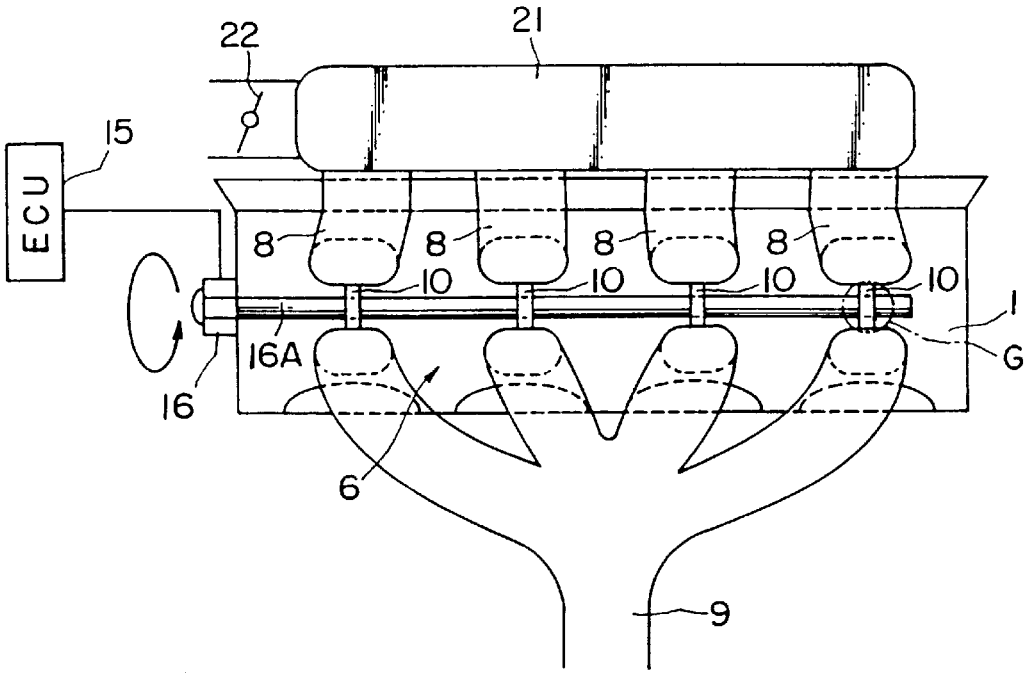
FIG. 3 is a schematic side view of the cylinder in the cylinder-injection, internal combustion engine according to the first embodiment of the present invention, as viewed in the direction of arrow D in FIG. 2.

The exhaust manifolds 9 arranged for the respective cylinders, on the other hand, merge on downstream sides thereof as depicted in FIG. 3 so that exhaust gas discharged from the respective combustion chambers is guided to an unillustrated muffler or the like.

As has been described above, each cylinder is provided with the two intake ports 4 on the side of the reference plane 40. The two exhaust ports 5 are arranged on the opposite side of the reference plane 40. The two intake ports 4 are formed, as illustrated in FIGS. 1, 5, 6, 7 and 9, to extend at least at downstream sides thereof toward the opening 4A to the combustion chamber along the cylinder axis 42.

Incidentally, the cylinder head 1 is provided with an injector mount portion 1a and a spark plug mount portion 1b. The injector 18 as fuel injection means and a spark plug 20 as spark ignition means are disposed at the injector mount portion la and the spark plug mount portion 1b so that an injection nozzle 18A and an igniting portion 20A are exposed to the combustion chamber 7.

Namely, the spark plug mount portion 1b is provided, as shown in FIGS. 1, 5, 7 and 9, centrally on the lower wall of the cylinder head 1, that is, at a central top of the combustion chamber 7, in other words, on the cylinder axis 42 or at a location near the cylinder axis 42. The spark plug 20 is arranged with a downward orientation at the spark plug mount portion 1b. The injector mount portion 1a, on the other hand, is located on the lower wall of the cylinder head 1 at a location outside the intake port 4. The injector 18 is disposed at the injector mount portion 1a with the injection nozzle 18A facing the combustion chamber 7, so that fuel is injected directly into the combustion chamber 7. In the illustrated embodiment, especially, the injector 18 is arranged in such a way that the fuel so injected can reach the vicinity of the igniting portion 20A of the spark plug 20.

A high-pressure pump 19 is connected to the injector 18 via an accumulator 25. The injector 18 is controlled, for example, by an unillustrated controller, whereby fuel is injected in a predetermined amount at a predetermined timing.

It is because of the provision of the two intake ports 4 on the cylinder head 1 in a direction extending along the cylinder axis 42 as described above that the injector mount portion 1a can be disposed outside the intake port 4. Such a construction of each intake port 4 permits a freer layout compared with a conventional bent intake passage so that a space sufficient to mount the injector 18 is obtained around the opening 4A, especially on an outer side of the intake port 4, said outer side being remote from the exhaust port 5.

Figure 9:
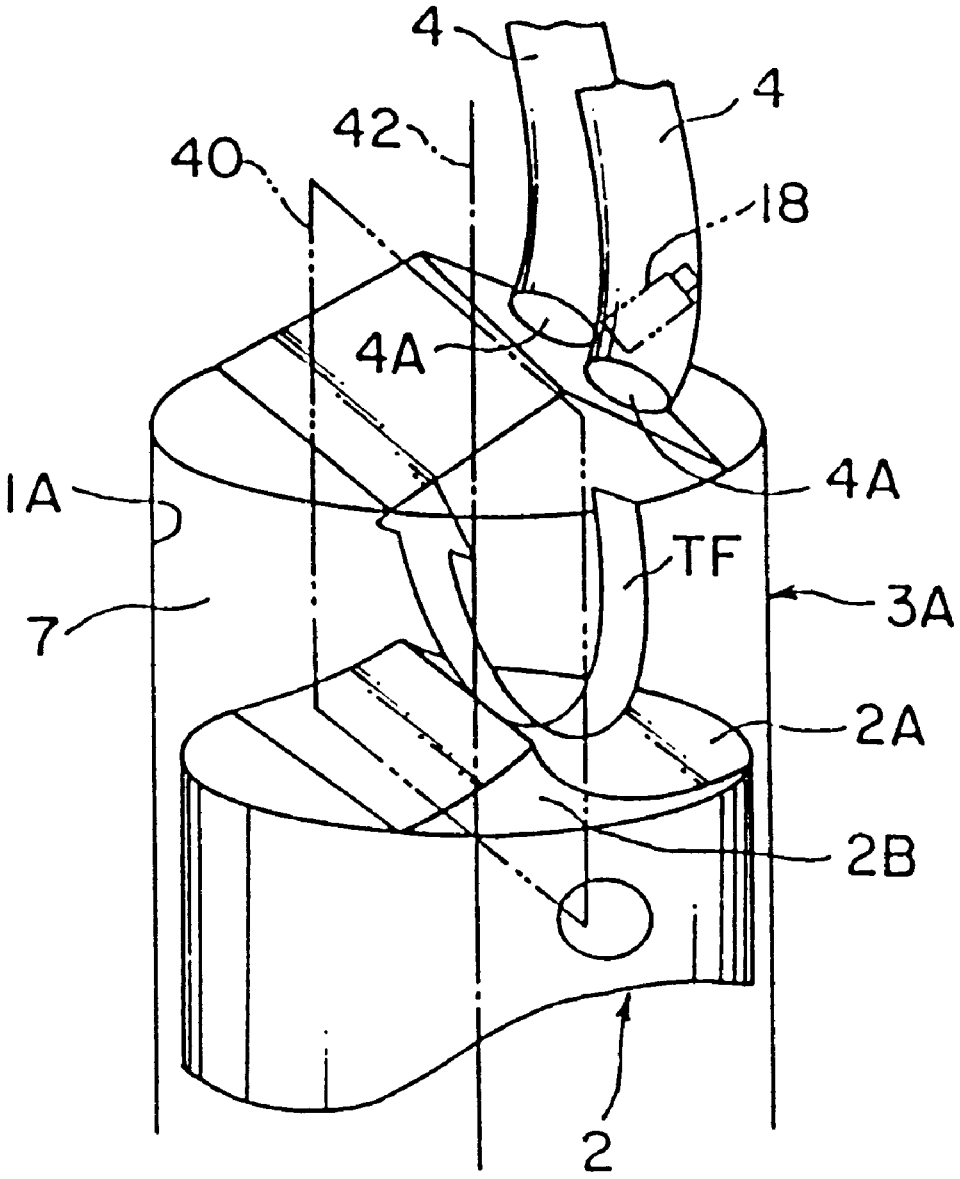
FIG. 9 a schematic overall perspective view showing the internal construction of the cylinder-injection, internal combustion engine according to the first embodiment of the present invention.

In the top wall of the piston 2 fitted in the cylinder 3A, a recessed portion (concave portion) 2A is formed as shown in FIGS. 5 and 9. This recessed portion 2A is located at a position eccentric toward the intake port 4 from the reference 40, is arranged at a part of a top portion of the piston 2 right below the intake port 4, and is formed substantially in a downwardly convex, spherical shape.

On the top wall of the piston 2 at a location right below the exhaust port 5, a raised portion 2B is formed adjacent to the recessed portion 2A. This raised portion 2B is formed so that it continues at a top portion (ridge-line) 2D with a gently sloping, curved edge portion 2C of the recessed portion 2A. The top portion 2D is located on the cylinder head 1 at a location somewhat eccentric toward the exhaust port 5 from the spark plug 20, in other words, on the opposite side of the reference plane 40.

When the piston 2 has ascended close to top dead center, for example, is located at the final position during a compression stroke, a compact combustion chamber 7A is formed while being surrounded by the recessed portion 2A of the piston 2, the inner wall IA of the cylinder and the cylinder head 1.

Figure 11:
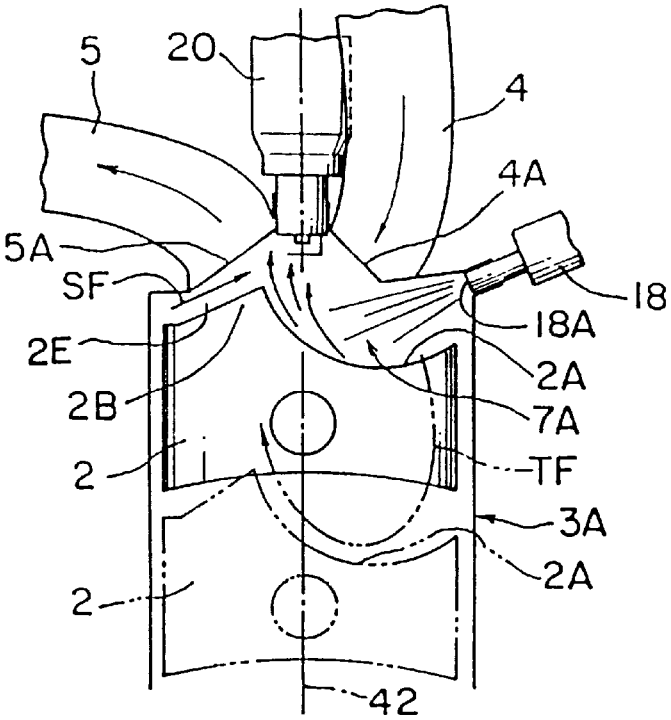
FIG. 11 corresponds to FIG. 5 and is a schematic view showing operation of the cylinder-injection, internal combustion engine according to the first embodiment of the present invention.

As is also illustrated in FIG. 11, when the piston 2 has ascended close to top dead center, for example, is located at the final position during a compression stroke, the raised portion 2B on the top wall of the piston 2 is located close to the top wall of the combustion chamber 7, said top wall being on the side of the exhaust port 5, so that a squish area 2E is formed therebetween.

By the downstream portion of the intake port 4, said downstream portion extending along the cylinder axis 42, and the recessed portion 2A below the intake port 4, an intake air flow inducted through the intake port 4 flows downwardly toward the piston 2 and then upwardly along the recessed portion 2A of the piston 2 as shown in FIGS. 5, 9 and 11, so that formation of a vertical vortex (hereinafter called the "reverse tumble flow") TF is promoted.

The flow directing toward the spark plug 20 at this time includes, in addition to the reverse tumble flow TF, the squish SF formed in the squish area 2E as the piston 2 ascends as shown in FIG. 11. The squish SF is guided by the raised portion 2B and the top wall of the combustion chamber 7, so that the squish SF is a flow directing toward the top center of the combustion chamber 7. The squish SF and the reverse tumble flow TF collide against each other so that the air-fuel mixture is agitated and disturbance of the air-fuel mixture is enhanced.

When fuel is injected at a latter stage of a compression stroke, the fuel is surely received in the compact combustion chamber 7A and is prevented from spreading to peripheral areas of the piston 2. It is therefore possible to reduce penetration of the fuel into a space between an outer peripheral wall of the piston 2 and an inner peripheral wall of the cylinder 3A. As a consequence, the compact combustion chamber 7A can also contribute to a reduction in the concentration of HC in exhaust gas.

Figure 10:
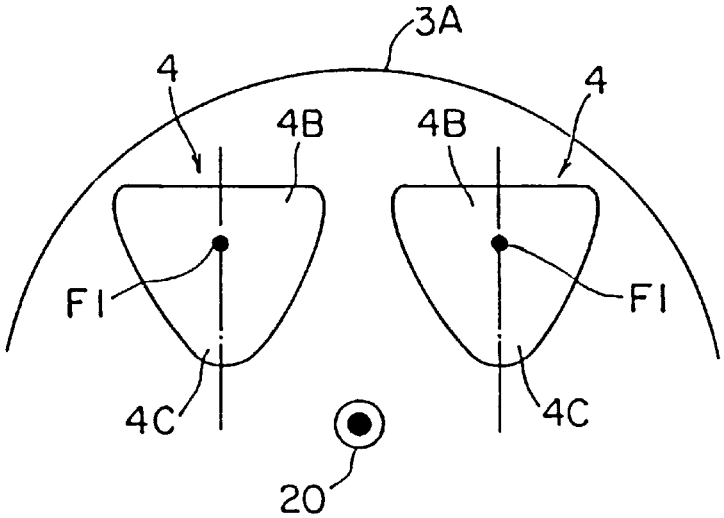
FIG. 10 is a fragmentary cross-sectional view showing the cross-sectional configuration of the intake port in the cylinder-injection, internal combustion engine according to the first embodiment of the present invention, as viewed in the direction of arrows X—X of FIG. 5.

As to the cross-sectional configuration of each intake port 4 in the first embodiment, a half portion 4B of the intake port 4, said half portion 4B being on a side of the reverse tumble flow TF (namely, an outer half portion of the intake port 4 through which outer half portion a main flow component forming the reverse tumble flow TF flows) is wider than the other half portion 4C (namely, an inner half portion of the intake port 4 through which inner half portion a flow component suppressing the reverse tumble flow TF flows) as shown in FIGS. 5, 6 and 10. A central axis Fl of the intake air flow through the intake port 4 is therefore offset toward the reverse tumble flow TF, in other words, toward the outer half portion 4B of the intake port 4.

Figure 8:
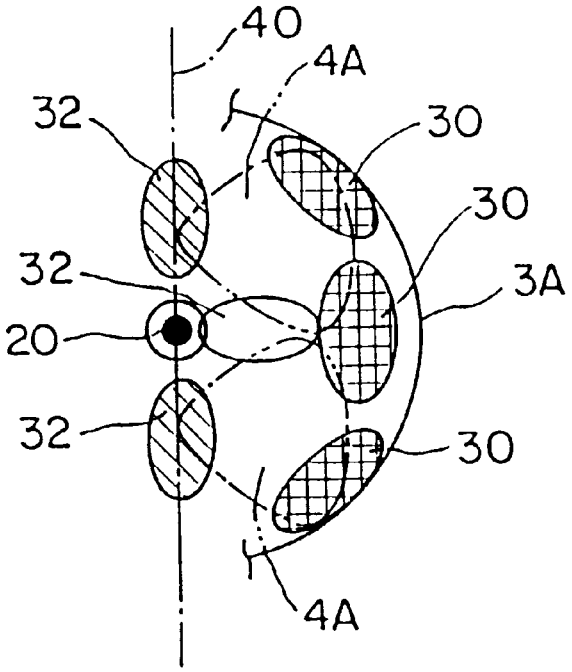
FIG. 8 is a schematic view showing flows of intake air in the cylinder-injection, internal combustion engine according to the first embodiment of the present invention, as viewed in the direction of arrow B in FIG. 5.

In this embodiment, especially, each intake port 4 is formed to have an approximately triangular cross-section as illustrated in FIG. 10. On an upstream side of the portion of the intake port 4, said portion having the approximately triangular cross-section, the intake port 4 is formed so that the cross-sectional configuration gradually becomes a triangle from an upstream portion of the intake port 4 or from a portion of the intake manifold more upstream of the intake port 4. In the vicinity of the opening 4A of the intake port 4, the intake port 4 ha such a triangular cross-section as shown in FIG. 8 so that its cross-section is widened on the opposite side of the reference plane 40, namely, on a side closer to the cylinder inner wall 1A of the combustion chamber 7.

As a result, the intake air flow in the intake port 4 becomes stronger on the side closer to the inner cylinder wall 1A (i.e., on the side of the main flow component forming the reverse tumble flow TF) than on the other half portion. As indicated at numerals 30 in FIG. 8, especially, intake air flows are enhanced at parts effective for the formation of the reverse tumble flow TF.

On the other hand, the intake air flow becomes weak in the other half portion 4C so that intake air flows at parts inhibiting the formation of the reverse tumble flow TF and indicated by numerals 32 become significantly weaker compared with the above-described flows at the parts 30.

As a result, the intake air flow inducted from the intake port 4 into the combustion chamber 7 descends inside the cylinder 3A toward the piston while being bent from the half portion 4B on the side of the reverse tumble flow TF to the other half portion 4C and is then deflected upwards by the above-described recessed portion 2A of the piston 2, whereby the reverse tumble flow is formed.

Control of the fuel injection of the internal combustion engine is conducted in a manner as described next.

Figure 13:
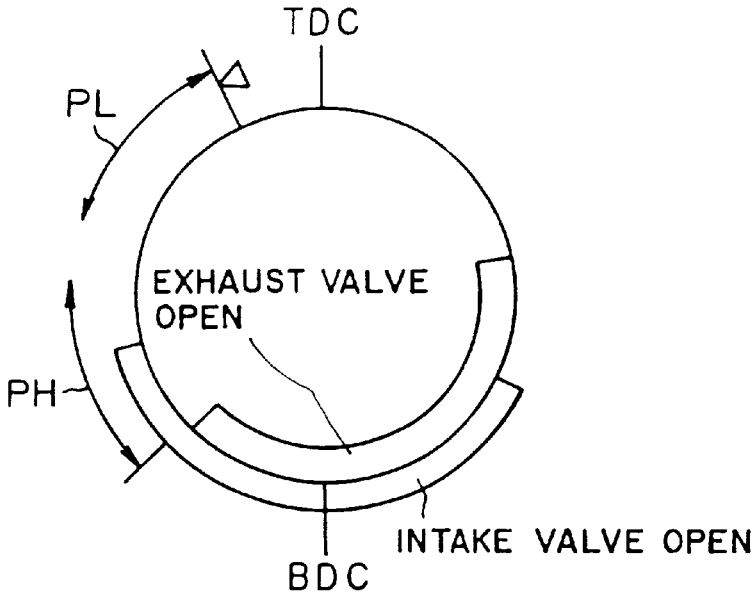
FIG. 13 diagrammatically shows a drive cycle when the cylinder-injection, internal combustion engine according to the first embodiment of the present invention is applied as a 2-cycle engine.

Assume, for example, that such an internal combustion engine is a 4-cycle engine. As is illustrated in FIG. 13, the intake valve 13 is opened in advance of 0° of TDC (an abbreviation of top dead center) to enter an intake stroke and the exhaust valve 14 is closed after 0° of TDC to complete the preceding exhaust stroke. The piston 2 then descends to 180° in terms of crank angle. During this, the reverse tumble flow TF is formed as shown in FIGS. 5 and 11 and fuel is injected from the injector 18 into this reverse tumble flow TF.

Figure 12:
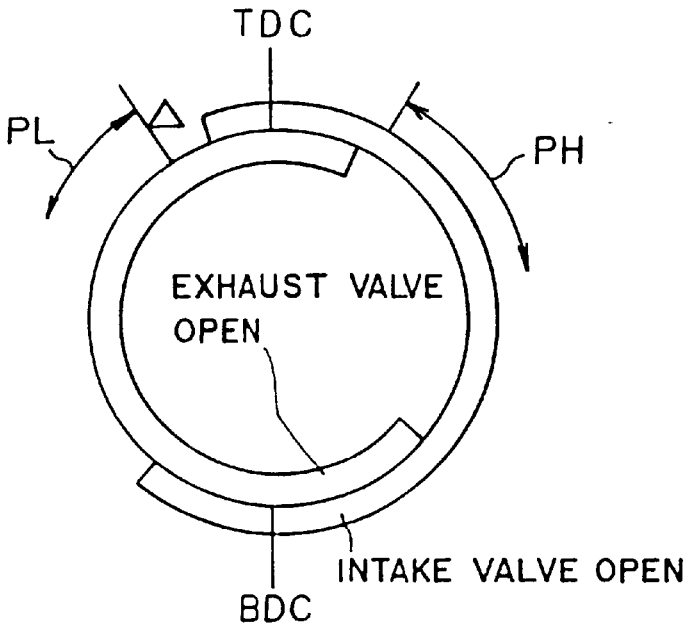
FIG. 12 diagrammatically illustrates a drive cycle when the cylinder-injection, internal combustion engine according to the first embodiment of the present invention is applied as a 4-cycle engine.

The injection timing of the injector 18 is controlled such that, as is illustrated in FIG. 12, the injector 18 is driven to inject at a predetermined injecting time PH in an early stage of intake upon high-speed rotation but the injector 18 is driven to inject at a predetermined injection time PL in a latter stage of compression upon low-speed rotation.

By initiating in an early stage the mixing of the fuel with the air forming the reverse tumble flow TF upon high-speed operation, it is possible to promote the homogenization of fuel and hence to achieve quick combustion. Upon low-speed operation, on the other hand, the injection of fuel is retarded pending the formation of the compact combustion chamber 7A. Fuel is then injected into the compact combustion chamber 7A so that ignitability can be fully assured while also being disturbed by the squish SF.

Then, a little ahead of 360° of TDC, the squish SF shown in FIG. 11 also acts so that a further disturbance is produced to the air-fuel mixture flowing from the compact combustion chamber 7A toward the spark plug 20 to further improve the combustibility. When a prescribed ignition time is reached immediately after that, the spark plug 20 is energized to effect ignition [as indicated by a triangle mark (Δ) in FIG. 12].

By the ignition, the internal cylinder pressure of the combustion chamber 7 increases to push down the piston 2 so that output power is produced. This combustion stroke is conducted close to 540° in terms of crank angle. Near the crank angle of 480°, the exhaust valve 14 is opened and an exhaust stroke is continued until the crank angle of 720° is passed. The intake valve 13 is then opened to conduct the next intake stroke, whereby the four cycles have been completed.

Formation of the compact combustion chamber 7A in a spherical configuration makes it possible to reduce the heat loss and also to achieve stabilization during low-load operation. Since the mount portion of the injector 18 is located outside the paired intake ports 4A, it is relatively easy to improve the maintenance of the main body of the injector 18 and fuel under cooler conditions. This makes it easier to assure the durability of the injector 18 and to eliminate heat-related troubles to the injector 18.

Next assume, for example, that such an internal combustion engine is a 2-cycle engine. As is shown in FIG. 13, a preceding combustion stroke is conducted from 0° of TDC. After 90° in terms of crank angle, the exhaust valve 14 is opened to enter an exhaust stroke. After reaching near the crank angle of 120°, the intake valve 13 is opened to also enter an intake (scavenging) stroke.

After BDC (an abbreviation of "bottom dead center"), the exhaust valve 14 is closed shortly before the crank angle of 230° to enter a compression stroke. The injector 18 is driven for the predetermined injection time PH when the engine is operated at a high speed under a high load but for the predetermined injection time PL when the engine is operated at a low speed under a low load, whereby fuel is injected. After then, the intake valve 13 is also closed to complete the intake and exhaust and a compression stroke alone is performed.

When a predetermined ignition point before TDC is reached, the spark plug 20 is energized to perform ignition [as indicated by a triangle mark (Δ) in FIG. 13]. By this ignition, the internal cylinder pressure of the combustion chamber 7 increases so that the piston 2 is pushed down to produce output power.

Here, the injector 18 is controlled to perform fuel injection for the predetermined injection time PH when the engine is operated at a high speed under a high load but for the predetermined injection time PL when the engine is operated at a low speed under a low load.

By initiating mixing of fuel with air, which makes up the reverse tumble flow TF, in an earlier stage when an engine is operated at a high speed, it is therefore possible to achieve quick combustion. At a low speed, on the other hand, the injection of fuel is retarded pending the formation of the compact combustion chamber 7A and the fuel is then injected into the compact combustion chamber 7A. This makes it possible to form a relatively rich air-fuel mixture in the vicinity of the spark plug 20 and, also assisted by the disturbing action of the squish SF, sure ignitability can be fully ensured.

In the internal combustion engine according to this embodiment, the intake manifold 8 is bent toward the exhaust valve 14 on the cylinder head 1 as depicted in FIG. 1. As a consequence, the intake manifold 8 and the exhaust manifold 9 are located close to each other at certain portions thereof.

Between the intake manifold 8 and the exhaust manifold 9 for each cylinder, the exhaust gas recirculation (EGR) system 6 is arranged. Owing to the EGR system 6, the amount of NOx in exhaust gas can be reduced.

This EGR system 6 is composed of an EGR passage 10, an EGR control valve 11, an ECU (electronic control unit) 15 and a stepper motor 16, all of which will be described hereinafter.

The EGR passage 10 is a passage for recirculating a part (will hereinafter be called "EGR gas") of exhaust gas discharged from an exhaust side (the exhaust manifold 9 in this embodiment) to an intake side (the intake manifold 8 in this embodiment). Outside the cylinder head 1, the EGR passage 10 is provided between the intake manifold 8 and the exhaust manifold 9 at their parts where they are located close to each other, so that the manifolds 8 and 9 are communicated with each other. In this embodiment, the cylinders are individually provided with the EGR passage 10.

The EGR passage 10 has a large passage diameter sufficient to feed a large amount of EGR gas to the intake side.

To permit feeding of EGR gas to the intake manifold 8 without cooling the EGR gas, the EGR passage 10 is thermally insulated, for example, by covering it with a heat-insulating material or the like.

Inside each EGR passage 10, the EGR control valve 11 is provided. Depending on the opening of the EGR control valve 11, the flow rate of EGR gas to be fed into the intake manifold 8 can be adjusted.

Figure 4A:
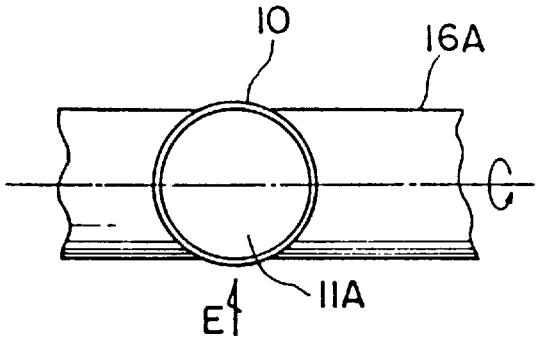
Figure 4B:
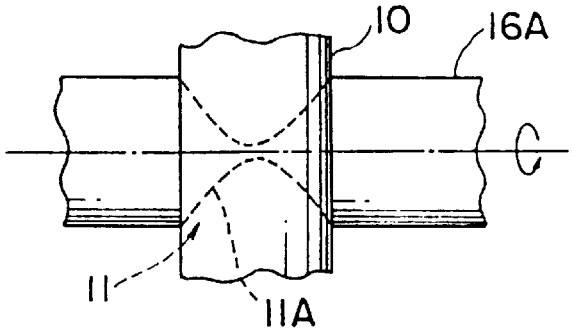
Figure 4C:
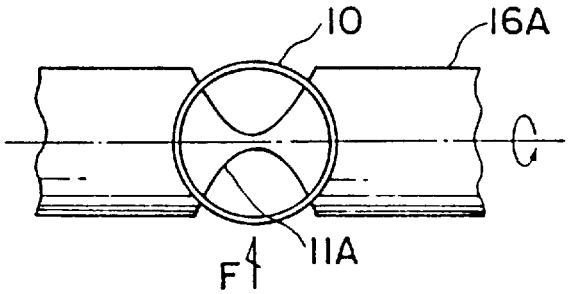
Figure 4D:
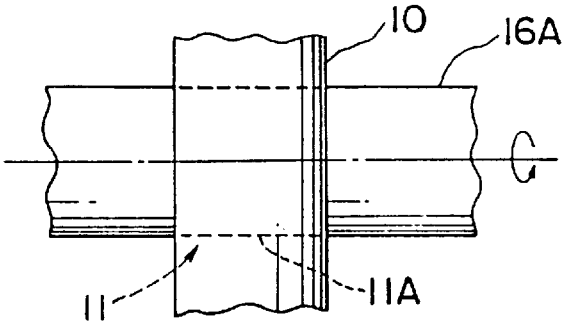

The EGR control valve 11 is constructed of a valve main body 11A and the stepper motor 16 as a drive system for driving the valve main body 11A. In this embodiment, the valve main body 11A of the control valve 11 arranged in each EGR passage 10 is provided as an integral unit with a rotor 16A as shown, for example in FIGS. 4(a) through 4(d). The EGR control valve 11 is therefore constructed as a rotary valve. Incidentally, FIGS. 4(a) and 4(b) show a state in which the EGR passage 10 is closed by the valve main body 11A of the EGR control valve 11. FIGS. 4(c) and 4(d), on the other hand, illustrates a state in which the EGR passage 10 has been fully opened. Further, FIGS. 4(a) and 4(c) are schematic view as viewed from the side of an axis of the EGR passage 10, while FIGS. 4(b) and 4(d) are schematic views as viewed from a side relative to the EGR passage 10 and the rotor 16A. FIG. 4(b) is a view taken in the direction of arrow E in FIG. 4(a), while FIG. 4(d) is a view taken in the direction of arrow E in FIG. 4(c).

As is illustrated in FIG. 4, the rotor 16A is arranged at approximately a right angle relative to the EGR passage 10 and extends through the EGR passage 10. Each valve main body 11A has been formed by removing a part of the rotor 16A. Depending on the angle of rotation of the rotor 16A, the cross-sectional area of the EGR passage 10 can be changed.

The stepper motor 16 as a drive system serves to drive the rotor 16A. By suitably rotating the stepper motor 16 into a desired phase, the opening of the EGR control valve 11 can be adjusted.

The stepper motor 16 is operated to set the control valve at a desired opening in accordance with a signal which is transmitted from the ECU (electronic control unit) 15 on the basis of information on various sensors (not shown).

The construction of this EGR control valve 11 is not necessarily limited to such a rotary valve but can be, for example, a butterfly valve such as that employed in the throttle valve 22.

Since the internal combustion engine as the first embodiment of the present invention is constructed as described above, it can bring about the following effects and advantages.

The intake port 4 is provided substantially upright in the direction of the cylinder 3A so that the intake port 4 extends along the cylinder axis 42. There is hence a sufficient space around the opening 4A, especially at a location which is remote from the exhaust port 5 and is outside the intake port 4. The injector 18, the spark plug 20 and the like can therefore be mounted in optimal orientations at optimal positions.

Since the intake and exhaust passages can be enlarged, a sufficient volumetric efficiency can be assured.

Successively following the strokes, the operation of the internal combustion engine will be described. During an intake stroke of the engine, firstly, an intake air flow enters the combustion chamber 7 from each intake port 4 through the opening 4A.

During this intake stroke, a part of exhaust gas discharged in the preceding exhaust stroke flows as EGR gas into the intake port 4 through the EGR passage 10 while being regulated in flow rate by the EGR valve 11. The EGR gas is then mixed with air and flows into the combustion chamber 7.

Because the intake port 4 is disposed substantially upright in the direction of the cylinder 3A and hence extends along the cylinder axis 42, the intake air flow flowed into the combustion chamber 7 advances downwards, that is, toward the piston 2.

Each intake port 4 has an approximately triangular cross-sectional configuration with the half portion 4B, which is on the side of the reverse tumble flow TF, being more widened than the other half portion 4C, so that the central axis Fl of the air flow inducted through the intake port 4 is offset toward the reverse tumble flow TF. In the intake port 4, the intake air flow component in the half portion 4B on the side of the reverse tumble flow is greater in amount than an intake air flow component in the other half portion 4C.

The intake air flow component which advances into the combustion chamber 7 from the half portion 4B of the intake port 4 on the side of the reverse tumble flow is a flow component which forms a reverse tumble flow. On the other hand, the intake air flow component advancing into the combustion chamber 7 from the other half portion 4C of the intake port 4 is a flow component which prevents the reverse tumble flow. Formation of a reverse tumble flow can therefore be facilitated.

The intake air flow inducted downwardly from an upper part of the combustion chamber 7 to a lower part of the combustion chamber 7 hits the recessed portion 2A in the top wall of the piston 2. It has flow distribution that facilitates a reverse tumble flow as described above. Further, the curved surface configuration of the recessed portion 2A promotes the reverse tumble flow so that the intake air flow smoothly changes its direction toward an upper part of the combustion chamber 7 while being guided by the curved surface configuration of the recessed portion 2A.

As a result, the reverse tumble flow TF is formed.

Smooth intake and exhaust are therefore feasible in various internal combustion engines such as 4-cycle gasoline engines and diesel engines. When the internal combustion engine is a 2-cycle gasoline engine, this tumble flow TF serves as a scavenging flow so that sufficient scavenging effect can be obtained, thereby making it possible to improve the power output performance.

Through the injection nozzle 18A of the injector 18, fuel is injected directly into the combustion chamber 7 at a timing corresponding to an operation state of the engine. At low-speed rotation of the engine, for example, the fuel is injected at the timing indicated by symbol PL in FIG. 12 or 13. At high-speed rotation of the engine, for example, the fuel is injected at the timing indicate by symbol PH in FIG. 13 or 14.

The fuel so injected is mixed with the air which has formed or is forming the reverse tumble flow TF as described above, whereby an air-fuel mixture is formed.

The resulting air-fuel mixture reaches the vicinity of the spark plug 20 centrally disposed in the top portion of the combustion chamber 7 while the air-fuel mixture is agitated fully by the reverse tumble flow TF and atomization of the fuel and mixing of the fuel with the air are promoted. The ignitability of the air-fuel mixture is improved, thereby making it possible to obtain a stable burning state.

During high-speed and high-load operation, the mixing of the fuel with the air in the form of the reverse tumble flow TF is initiated in an early stage so that quick combustion can be achieved. During low-speed and low-load operation, on the other hand, the fuel injection is retarded pending the formation of the compact combustion chamber 7A. Fuel is then injected into the compact combustion chamber 7A. A relatively rich air-fuel mixture can therefore be formed in the vicinity of the spark plug 20 and, further assisted by disturbing action of the squish SF, sufficient ignitability is achieved.

By enhancing the reverse tumble flow TF as described above, the cylinder-injection internal combustion engine permits lean burn operation in a stable state with an air-fuel mixture leaner than the stoichiometric air/fuel ratio without impairing the ignitability.

After compression and expansion (explosion) in the combustion chamber 7, the resulting gas is exhausted through the exhaust port 5 and then through the exhaust manifold 9.

At this time, a portion of the exhaust gas is introduced as EGR gas into the EGR passage 10. The opening of the EGR control valve 11 disposed in the EGR passage 10 is adjusted depending on the operation state of the engine, so that the EGR gas is allowed to flow into the intake port 4 of each cylinder as described above.

Here, the EGR control valve 11 is driven by the stepper motor 16 in accordance with a command from the ECU 15, whereby the EGR passage 10 is suitably regulated from a fully opened state to fully closed state. The EGR gas, which has recirculated in an adequate amount to the intake port 4 of each cylinder, is mixed with air and is allowed to flow into the combustion chamber 7. By recirculating a portion of exhaust gas to an intake side, the amount of NOx in the exhaust gas can be reduced.

The EGR passage 10 is covered by an heat insulating material or the like so that the temperature of EGR gas does not drop. EGR gas of a high temperature can therefore be fed to the intake port 4 so that the amount of NOx in exhaust gas can be reduced while stabilizing the state of combustion in the engine.

The EGR passage 10 is arranged between the intake manifold 8 and the exhaust manifold 9 at their portions where they become closer to each other, whereby the overall length of the EGR passage 10 is short. Here again, the temperature of EGR gas is prevented from dropping so that the above-described advantage can be enhanced.

The EGR passage 10 is provided independently for each cylinder. This has made it possible to feed EGR gas evenly to the individual cylinders to that the distribution of EGR gas among the cylinders can be improved.

In a lean-burn internal combustion engine like this embodiment, the pressure of intake air is generally high and the difference in pressure between the intake port 4 and the exhaust port 5 is small in general. There is accordingly the potential problem that EGR gas may not be fed sufficiently. In the present invention, however, the EGR passages 10 are provided independently and have a sufficiently large diameter as described above. Each EGR passage 10 can therefore feed a large amount of EGR gas to the corresponding intake port 4.

It is therefore possible to significantly reduce the amount of NOx in exhaust gas, which NOx tends to occur in a large amount during lean burn.

Figure 14A:
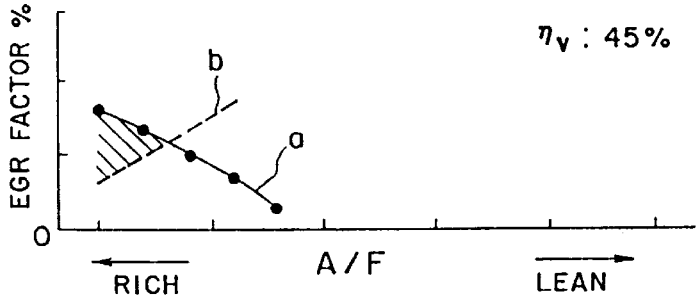
FIGS. 14(a) through 14(c) diagrammatically illustrate advantageous effects of the cylinder-injection, internal combustion engine according to the first embodiment of the present invention.
Figure 14B:
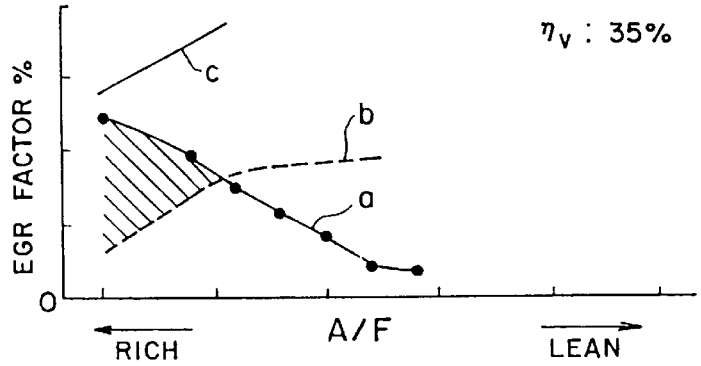
Figure 14C:
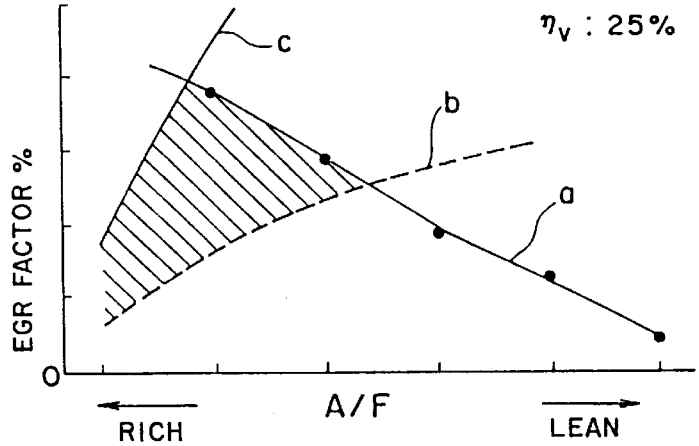

Regarding an engine equipped with the EGR system 6, a region in which a reduction in the amount of NOx and lean burn can be both achieved is indicated by hatching in FIGS. 14(a), 14(b) and 14(c).

The respective graphs of FIGS. 14(a) to 14(c) illustrate the results when the engine according to the present invention was operated under the below-described conditions. Namely, they show the results when the engine was operated by holding the engine speed constant, maintaining the volumetric efficiency $\eta v$ constant at 45%, 35% and 25%, respectively, at the stoichiometric air/fuel ratio, and fixing the feed amounts of fuel constant at the volumetric efficiencies, and then adjusting the air/fuel ratio by the throttle opening.

In each of these graphs of FIGS. 14(a) through 14(c), air/fuel ratios (A/F) are plotted along the axis of abscissas while mixing ratios of EGR gas to the intake air are plotted along the axis of ordinates.

Line a in each graph indicates a limit to the introduction of EGR gas, and shows that EGR gas above line a cannot be introduced.

Line b, on the other hand, indicates EGR gas required to reduce the amount of NOx by 90% or more. To purify exhaust gas, it is necessary to operate the engine while using EGR gas in an amount above line b.

Line c indicates the amount of EGR gas required to reduce combustion variations within 10%. A combustion variation serves to give an indication upon judging the combustion stability of an engine. If this variation is too high, combustion in the engine is not stabilized, resulting in an uncomfortable state of operation accompanied by variations in torque.

In other words, line c indicates that, for stable combustion, the engine must be operated with EGR gas below line c.

Lean burn of an engine can therefore be achieved when the engine is operated inside a region surrounded by the three lines, i.e., line a, line b and line c (indicated by hatching in the drawing).

By operating the engine under conditions in the regions hatched in the drawings, low fuel consumption and a substantial reduction in the amount of NOx can be achieved by lean burn while injecting fuel directly into the combustion chamber 7.

Here, advantageous effects available from the intake port 4 having a triangular cross-section as described above will be described in comparison with other port structures.

A description is now made of the construction of two types of port structure to be compared. One of these port structures is provided with a mask 38 at a port opening as shown, for example, in FIG. 17. This mask will next be described in brief. The mask 38 is provided at the opening 4A of an intake port, and covers a part of the other half portion 4C through which such an intake air flow as preventing the formation of the reverse tumble flow TF enters. The mask 38 can therefore promote the formation of the tumble flow TF. The mask 38 can take various forms such as Type A, Type B and Type C. Here, lines c represent characteristics when the mask 38 is of type B in FIG. 17.

Figure 18A:
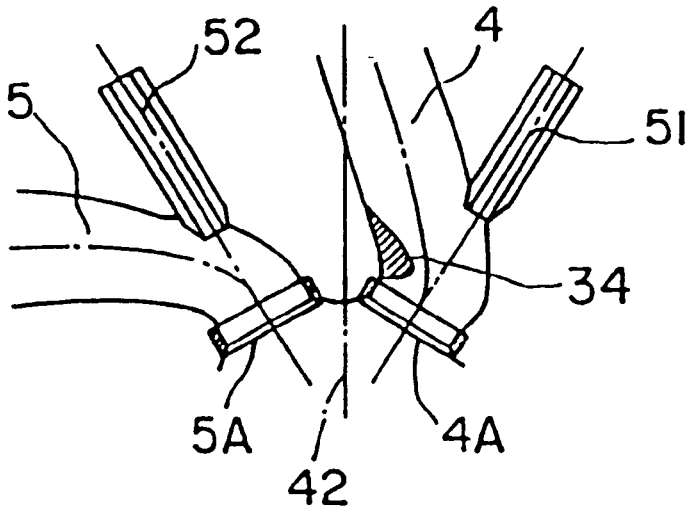
FIG. 18(a) (PRIOR ART)
FIGS. 18(a) and 18(b) are schematic views showing conventional structures for the formation of a tumble flow, which will be referred to for comparison upon description of effects of a tumble flow in the cylinder-injection, internal combustion engine according to the first embodiment of the present invention.

The other port is provided with a shroud (hereinafter called "port shroud"). The port shroud 34 or 36 is, as shown in FIG. 18, a raised portion disposed at a particular location inside the intake port 4 so that it can inhibit such an intake flow component as inhibiting the formation of a tumble flow. By the port shroud, it is possible to weaken such an intake flow component as inhibiting the reverse tumble flow TF.

Figure 15A:
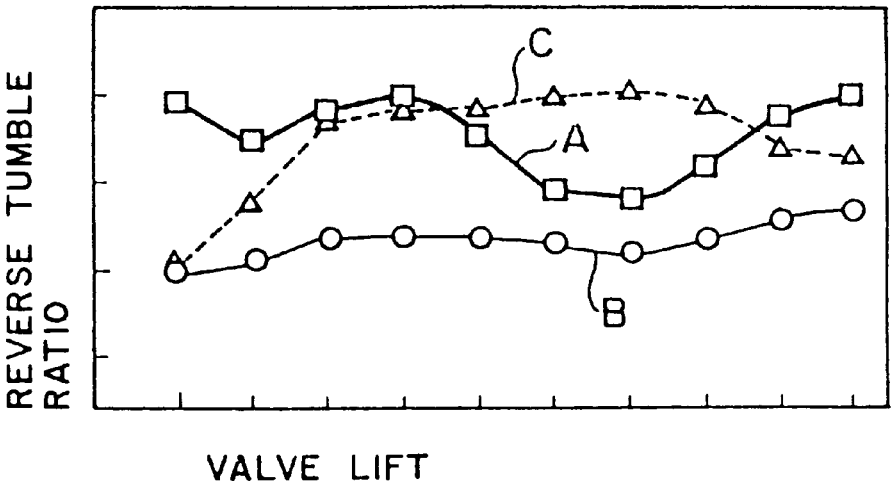
FIGS. 15(a) and 15(b) diagrammatically depict advantageous effects of the cylinder-injection, internal combustion engine according to the first embodiment of the present invention.
Figure 15B:
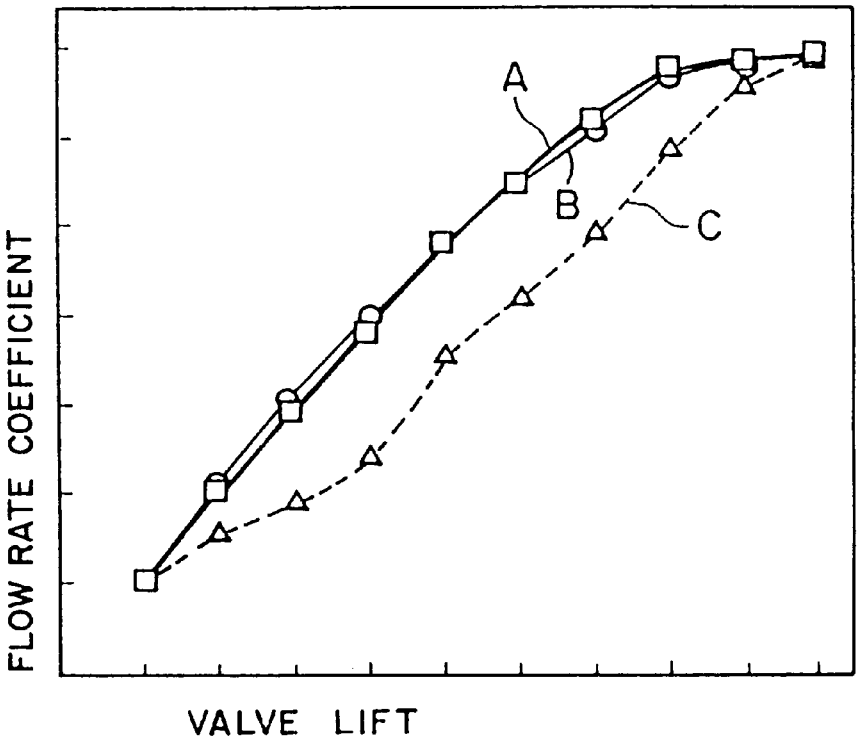

FIG. 15(a) is a graph showing a relationship between valve lifts of an intake valve and reverse tumble ratios, while FIG. 15(b) is a graph illustrating a relationship between valve lifts of an intake valve and flow-rate coefficients. In these two graphs, curves A show characteristics relating to the intake port 4 having an approximately triangular cross-sectional configuration, curve B characteristics pertaining to an intake port having a conventional circular cross-sectional configuration, and curve C characteristics relating to a conventional circular intake port equipped with a mask similar to the mask 38 shown in FIG. 17.

As is indicated by curve B in FIGS. 15(a) and 15(b), a conventional circular port can provide an intake air flow with a flow-rate coefficient but cannot practically obtain a reverse tumble ratio, because a reverse tumble component flows into the combustion chamber 7 from a part of the intake port 4, said part being on a side of an inner wall IA of the cylinder, and a flow component as inhibiting the formation of a reverse tumble flows in the combustion chamber 7 through another side of the intake port 4, said another side being on a side of a center of the cylinder. Further, as the cross-section of the port is circular, these two flow components become flows of substantially the same strength so that the formation of the reverse tumble flow TF is inhibited.

If an intake air flow from the part of the intake port 4, said part being on the side of the central axis 42 of the cylinder, is blocked using the mask 38 as indicated by curve C, the reverse tumble ratio can be improved to some extent compared with a conventional circular port as shown in FIG. 15(a) but no sufficient flow-rate coefficient can be obtained as illustrated in FIG. 15(b).

By forming the cross-section of a port into an approximately triangular cross-section, both a flow-rate coefficient and a reverse tumble ratio can be obtained sufficiently. Namely, curves A in FIGS. 15(a) and 15(b) indicate that the reverse tumble ratio can be made larger while retaining a flow-rate coefficient comparable with that available from a conventional port having a conventional circular cross-section.

Figure 16:
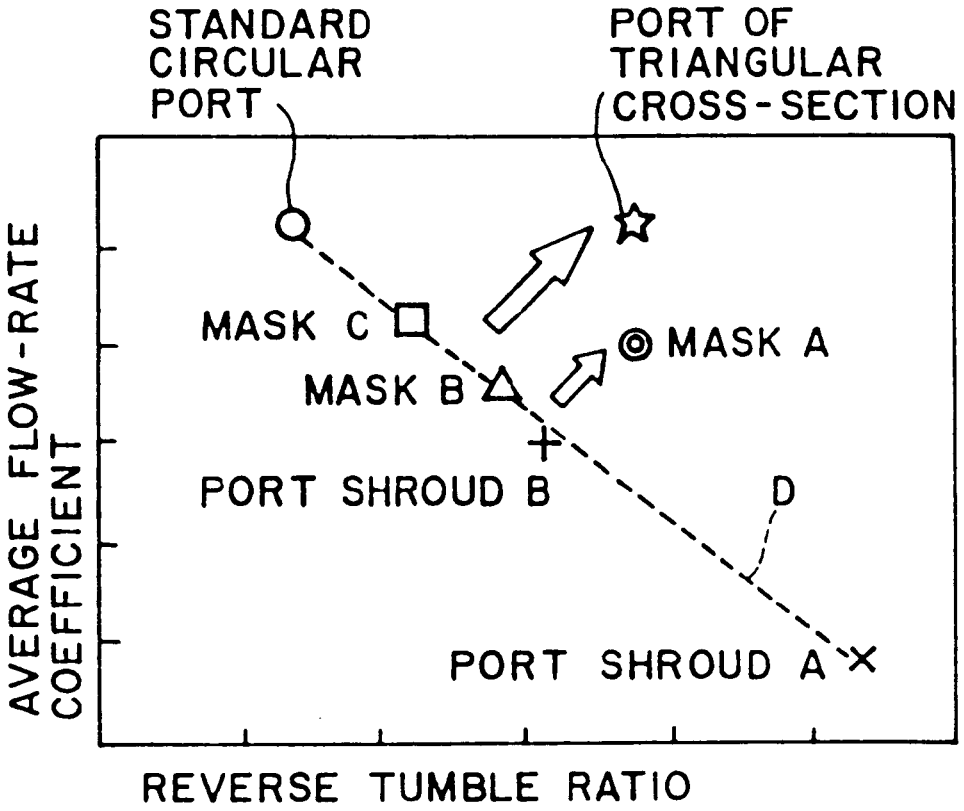
FIG. 16 diagrammatically shows advantageous effects of the cylinder-injection, internal combustion engine according to the first embodiment of the present invention.

FIG. 16 is a graph illustrating a relationship between reverse tumble ratios and average flow-rate coefficients. FIG. 16 also show similar relationships when a circular port is provided with the mask 38, the port shrouds 34,36 or the like as in the conventional art. Reverse tumble ratios and average flow-rate coefficients have heretofore been in a trade-off relationship. They are hence plotted on and along a particular straight line as indicated by a broken line D. Accordingly, an attempt to obtain a large reverse tumble ratio leads to a reduced average flow-rate coefficient while an attempt to obtain a large average flow rate coefficient results in a decreased reverse tumble ratio.

Incidentally, a star mark (☆) in the graph of FIG. 16 corresponds to a port having a substantially triangle cross-section. This FIG. 16 also shows both a sufficient flow rate coefficient and a sufficient reverse tumble ratio can be obtained by forming the cross-section of each port into a substantially triangular configuration.

Figure 18B:
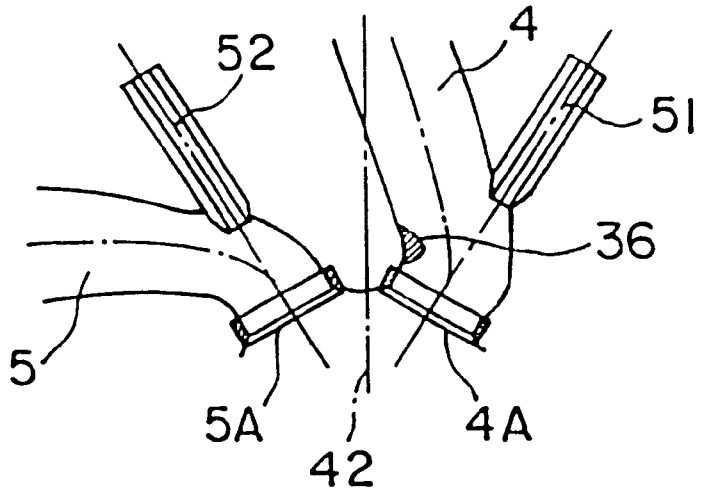
FIG. 18(b) (PRIOR ART)

The ports equipped with the port shroud 34,36, respectively, can form a strong reverse tumble flow TF. However, their flow-rate coefficients are significantly reduced by the shrouds 34,36. For example, the marks "X" and "+" in FIG. 16 indicate flow-rate coefficients when the port shroud 34 of FIG. 18(a) and the port shroud 36 of FIG. 18(b) are provided, respectively. As shown by these marks "X" and "+", a reduction in flow-rate coefficient cannot be avoided.

Figure 17:
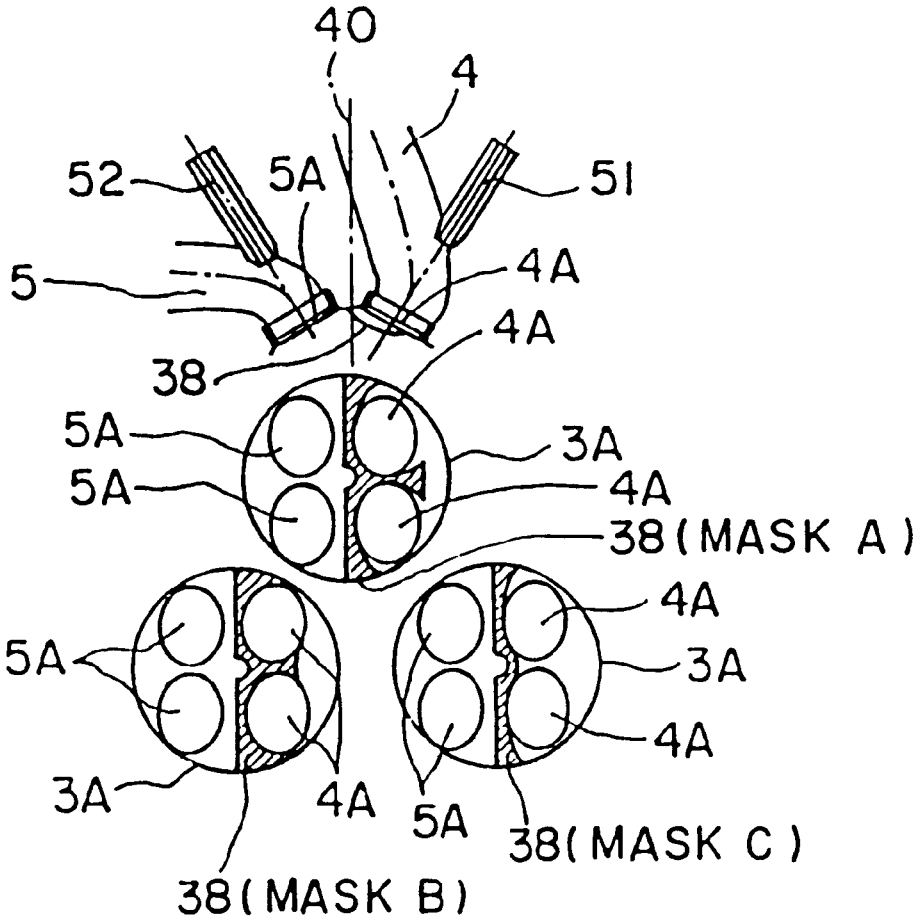
FIG. 17 (PRIOR ART)
FIG. 17 is a schematic view showing a conventional structure for the formation of a tumble flow, which will be referred to for comparison upon description of effects of a tumble flow in the cylinder-injection, internal combustion engine according to the first embodiment of the present invention.

As the types of the above-described mask 38, three types, i.e., Mask A, Mask B and Mask C are contemplated as shown in a lower part of FIG. 17. Characteristics of the individual types are indicated by marks (◎), Δ and □ in FIG. 16. Of these, the characteristics of the mask B and the mask C lie on the specific straight line D showing the trade-off relationship. When the mask A is used, however, the reverse tumble ratio can be improved without substantially lowering the flow-rate coefficient.

Moreover, as indicated by star marks (☆) in the graph of FIG. 16, the formation of a port cross-section into a substantially triangular configuration makes it possible to obtain a sufficient reverse tumble ratio while maintaining an average flow-rate coefficient substantially equal to that available from a port having a circular cross-section.

The second embodiment of the present invention will be described next.

The second embodiment is different from the above-described first embodiment only in the construction of the EGR system 6. The remaining structure is constructed as in the first embodiment. A description will hence be made of those relating to the EGR system 6.

Figure 19:
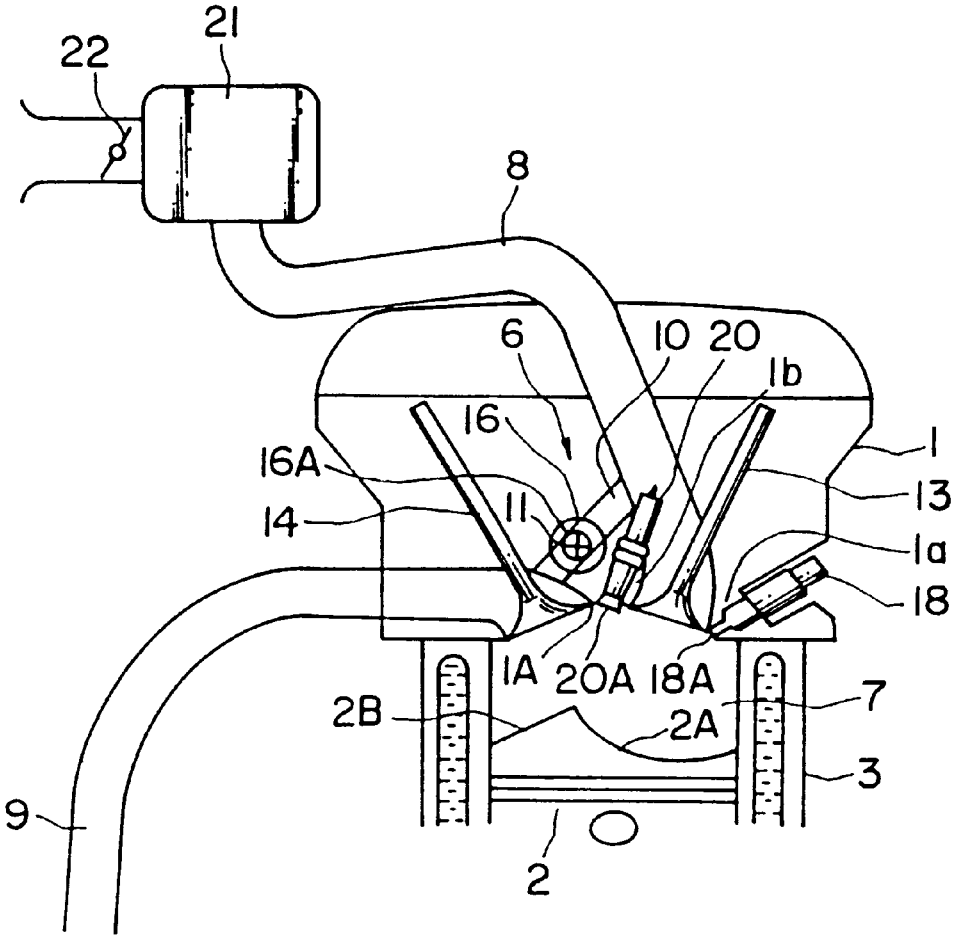
FIG. 19 corresponds to FIG. 1 and is a schematic view illustrating the overall internal construction of a cylinder-injection, internal combustion engine according to a second embodiment of the present invention.

As is shown in FIG. 19, an intake port 4 is disposed substantially upright on an upper part of the combustion chamber 7 in the engine so that the intake port 4 extends along the cylinder axis 42. An intake manifold 8 is connected to an upstream side of the intake port 4.

The upstream side of the intake port 4 is bent toward the exhaust port 5 and is disposed to extend through the cylinder head 1. Owing to this construction, the intake port 4 and the exhaust port 5 are disposed so that they become fully close to each other inside the cylinder head 1.

Inside the cylinder head 1, an EGR passage 10 is provided one for each cylinder so that the intake port 4 and the exhaust port 5 are connected together. When exhaust gas is given off from the exhaust port 5, EGR gas is almost simultaneously introduced into EGR passage 10, so that EGR gas is fed at a high temperature into the intake port 4.

An EGR control valve 11 is arranged in each EGR passage 10. Depending on the opening of the EGR control valve 11, the flow rate of EGR gas to be fed to the corresponding intake port 4 is controlled.

The EGR control valve 11 is constructed as a rotor valve as in the first embodiment. A main body 11A of the EGR control valve 11 is formed on a rotor 16A which is arranged substantially at a right angle relative to the EGR passage 10. The rotor 16A extends through the EGR passage 10 and, depending on the angle of rotation of the rotor 16A, the cross-sectional area of the EGR passage 10 is changed.

The rotor 16A is driven by a stepper motor 16 and is rotated to a desire phase. Depending on this rotation, the EGR passage 10 is opened or closed.

Figure 20:
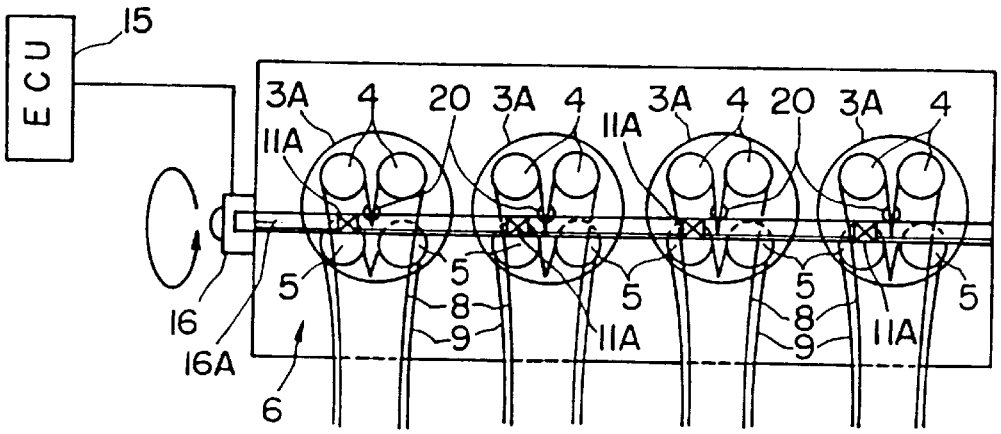
FIG. 20 corresponds to FIG. 2 and is a schematic top plan view of a cylinder head in the cylinder-injection, internal combustion engine according to the second embodiment of the present invention.
Figure 21:
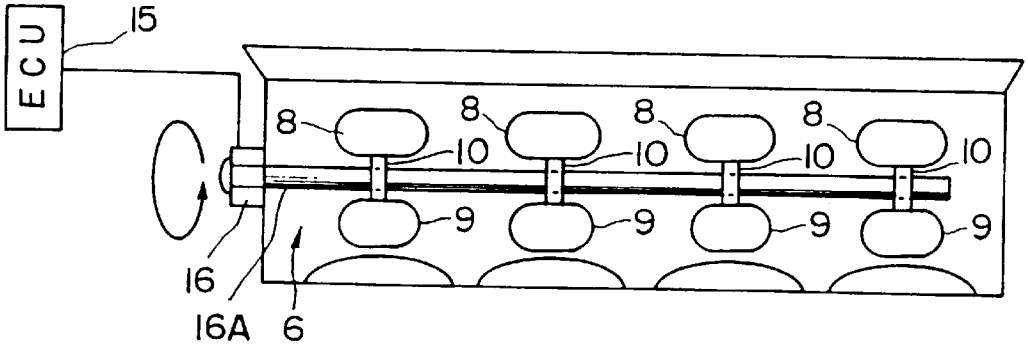
FIG. 21 corresponds to FIG. 3 and is a schematic side view of the cylinder in the cylinder-injection, internal combustion engine according to the second embodiment of the present invention.

As is illustrated in FIGS. 20 and 21, the EGR system 6 is provided with an ECU 15 and the stepper motor 16 similarly to the first embodiment. By these elements, the valve opening of the EGR control valve 11 is controlled in accordance with the state of operation of the engine.

As the cylinder-injection, internal combustion engine according to the second embodiment of this invention is constructed as described above, the EGR passage 10 is shortened more substantially than in the engine of the first embodiment and a large amount of EGR gas can hence be fed to the intake port 4 while maintaining it at high temperature. Combustion in the engine can be stabilized further.

As a consequence, the emission of NOx can be reduced significantly.

Further, by building the EGR passage 10 in the cylinder head 1, the EGR system 6 itself can be manufactured lighter in weight and smaller in dimensions.

Figure 22:
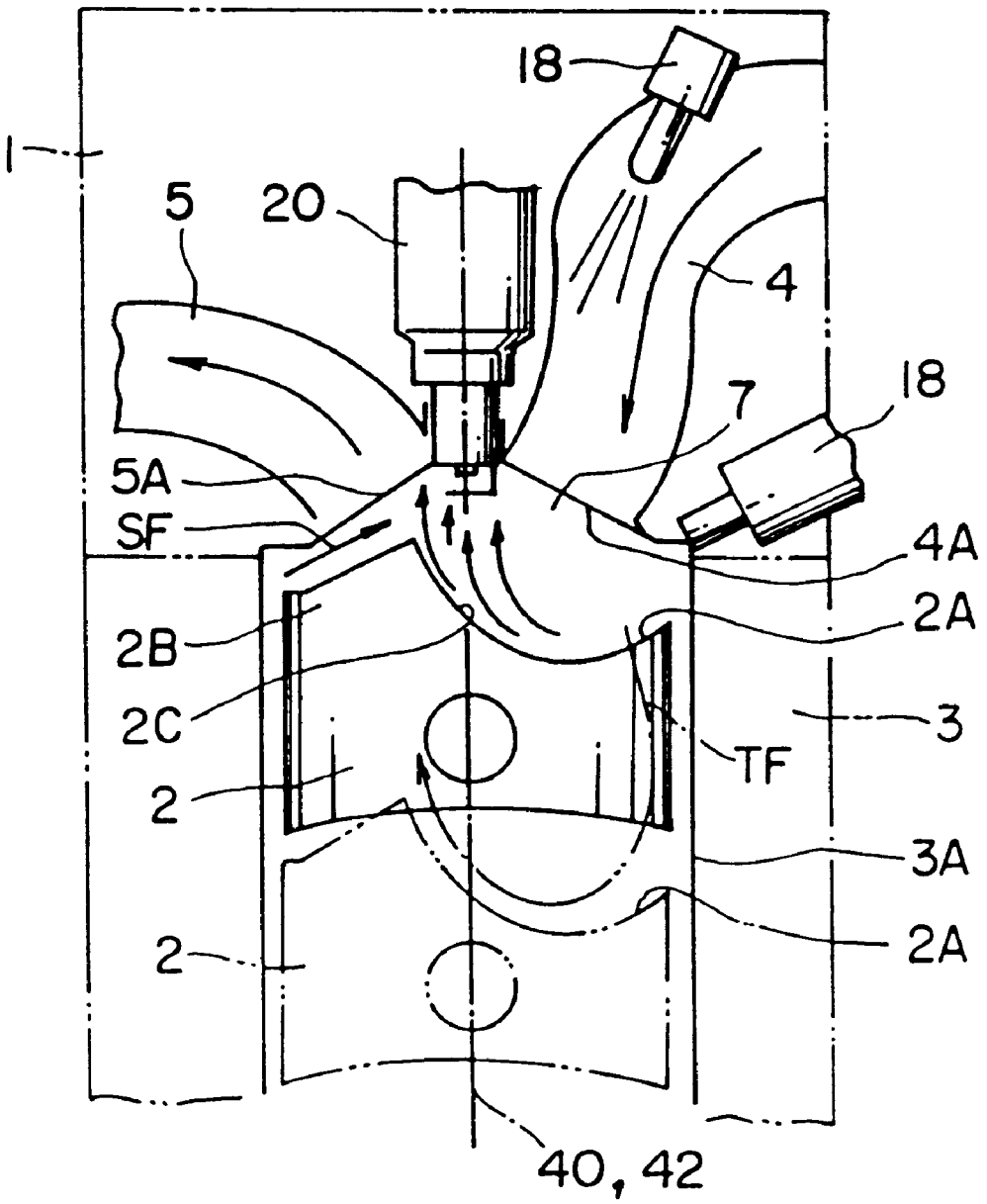
FIG. 22 is a schematic cross-sectional view showing a modification of the intake passage in the cylinder-injection, internal combustion engine.

In the internal combustion engine according to each of the embodiments described above, the upstream side of the intake port 4 is guided to a point above the cylinder head 1 and the intake manifold 8 is connected to the intake port 4 above the cylinder head 1. As is depicted in FIG. 22, the upstream side of the intake port 4 can be extended to a side of the cylinder head 1 and an unillustrated intake manifold can be connected to the intake port 4 on the side of the cylinder head 1. In FIGS. 22 and 1, like reference numerals indicate like elements of structure.

In this internal combustion engine, an intermediate portion of the intake port 4 is bent downwardly and, like the embodiments described above, a downstream side of the intake port 4 is formed extending downwardly and vertically over a desired length along the central axis 42 of the cylinder.

Even with such a structure of the intake port 4, a space is obtained around the opening 4A because the downstream side of the intake port 4 is directed vertically and downwardly over the desired length. This facilitates mounting of the injector 18 (shown by dotted lines), a spark plug and the like and the reverse tumble flow TF can be produced, thereby bringing about advantageous effects similar to those available from the embodiments described above.

The internal combustion engine shown in FIG. 22 is of the port injection type that the injector 18 is disposed in the intake port 4. By the injector 18, fuel is injected beforehand into air inside the intake port 4 so that an air-fuel mixture is formed there. This air-fuel mixture is inducted into the cylinder 3A during an intake stroke.

By forming the air-fuel mixture, which has advanced into the cylinder 3A, into a reverse tumble flow TF as described above, for example, during high-speed and high-load operation, mixing of the air-fuel mixture can be fully promoted and disturbance of the air flow can also be promoted during a compression stroke of the like. Quick combustion can hence be achieved.

During low-speed and low-load operation, for example, an air flow directed toward the spark plug 20 can be formed by the compact combustion chamber 7. This fully promotes mixing of the air-fuel mixture and, assisted further by agitating action of a squish, sufficient ignitability and combustion stability can be obtained.

As is understood from the foregoing, the construction of each internal combustion engine according to this invention can also be applied successfully to port-injection internal combustion engines.

In each of the embodiments described above, the internal combustion engine is constructed as a 4-valve internal combustion engine equipped with two intake valves and two exhaust valves. It is to be noted that the numbers of intake and exhaust valves in internal combustion engines according to the present invention are not limited to them. The present invention can be applied to various other constructions, for example, 3-valve internal combustion engines as shown in FIG. 23 and 5-valve internal combustion engines as shown in FIG. 24.

Figure 23:
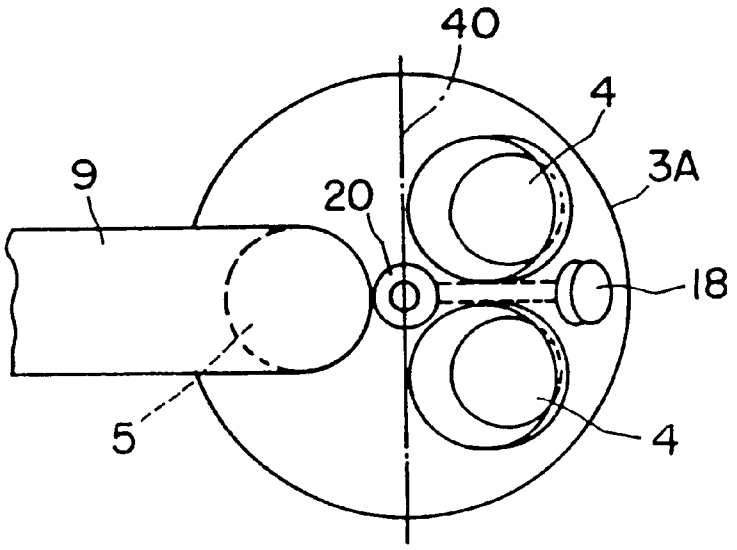
FIG. 23 is a schematic plan view showing a modification of the construction of the intake and exhaust ports in the cylinder-injection internal combustion engine according to the first embodiment of the present invention.

In the 3-valve internal combustion engine illustrated in FIG. 23, a pair of intake ports 4,4 are arranged on one side of a reference plate 40 as in the above-described embodiments, and a single exhaust port 5 is disposed on an opposite side of the reference plane 40. These intake and exhaust ports are selectively opened or closed by their associated intake valves and exhaust valve (not shown), respectively. Like each of the embodiments described above, downstream portions of the intake ports 4,4 are formed extending vertically and downwardly over a desired length along a central cylinder axis 42 whereas upstream portions of the intake ports 4,4 are connected to an unillustrated intake manifold. Further, a downstream portion of the exhaust port 5 is connected to an exhaust manifold 9. A spark plug 20 is disposed on a central cylinder axis 42 or at a position extremely close to the central cylinder axis 42.

Figure 24:
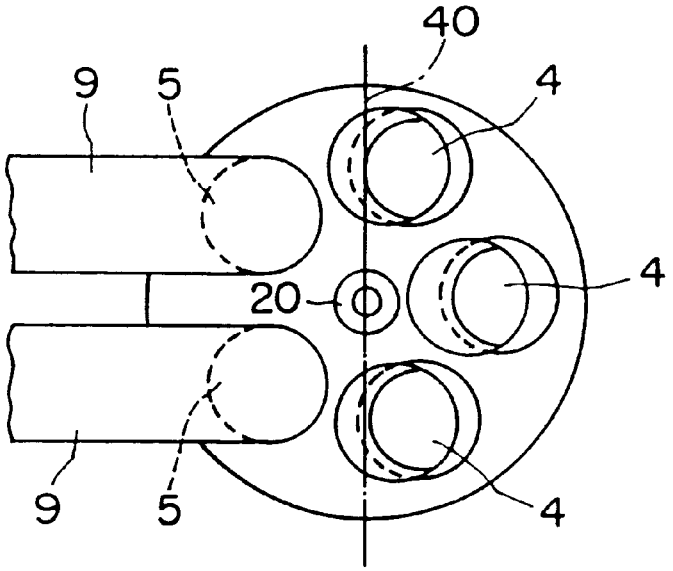
FIG. 24 is a schematic plan view showing another modification of the construction of the intake and exhaust ports in the cylinder-injection, internal combustion engine according to the first embodiment of the present invention.

In the 5-valve internal combustion engine depicted in FIG. 24, three intake ports 4,4,4 are arranged on one side of a reference plane 40 and two exhaust ports 5,5 are disposed on an opposite side of the reference plane 40. These intake and exhaust ports are selectively opened or closed by their associated intake valves and exhaust valves (not shown), respectively. Like each of the embodiments described above, downstream portions of the intake ports 4,4,4 are formed extending vertically and downwardly over a desired length along a central cylinder axis 42. A spark plug 20 is disposed on a central cylinder axis 42 or at a position extremely close to the central cylinder axis 42.

These 3-valve internal combustion engines and 5-valve internal combustion engines as shown in FIG. 23 and FIG. 24 can also bring about similar effects and advantages to those available from the internal combustion engines of the embodiments.

With respect to internal combustion engines having such varieties of valve constructions, the present invention can also be applied, as in the embodiments, not only to 2-cycle or 4-cycle, spark-ignition, internal combustion engines (for example, gasoline engines) but also to compression-ignition, internal combustion engines (for example, diesel engines). These various internal combustion engines can also bring about similar effects and advantages to those described above.

Although each cylinder is independently provided with an EGR passage and an EGR valve in each of the embodiments, EGR passages can be merged together and, for example, only one EGR valve can be provided to control EGR. As a still further alternative, the EGR system may be omitted.

The cylinder structure of the above internal combustion engine is applicable to internal combustion engines, in principle, irrespective the number of cylinders per engine and is certainly applicable to single-cylinder internal combustion engines.

We claim:

1. In an internal combustion engine having:

a combustion chamber formed between a top wall of a piston fitted in a cylinder and a lower wall of a cylinder head, an intake port formed through the cylinder head on one side of a reference plane in which a central axis of the cylinder is contained, said intake port communicating through an intake opening with the combustion chamber, an exhaust port formed through the cylinder head on an opposite side of said reference plane, said exhaust port communicating through an exhaust opening with the combustion chamber, and open/close valves disposed in the intake port and the exhaust port, respectively, the improvement comprising:

the intake port is formed extending upstream from the intake opening substantially along the cylinder axis; and the piston is provided at the top wall thereof with a recessed portion and a raised portion, said recessed portion being formed at a location off-set toward said one side to guide an intake air flow, which has been inducted into the combustion chamber, as a swirl about an axis extending in parallel with a line which in turn extends at a right angle relative to the cylinder axis, and said raised portion being formed on the opposite side of said reference plane to extend in continuation with an [upwardly gently sloping] edge portion of the recessed portion, whereby the raised portion approaches the lower wall of the cylinder head at top dead center of the piston.

2. An internal combustion engine of claim 1, wherein fuel injection means is disposed on a side of the intake port through a side wall of the cylinder head, whereby said fuel injection means faces the combustion chamber.

3. An internal combustion engine of claim 2, wherein the intake port is wider on a side remote from the cylinder axis than on a side close to the cylinder axis.

4. An internal combustion engine of claim 3, wherein an intake pipe communicating with an upstream end of the intake port is formed extending from an upper wall of the cylinder head toward the opposite side of said reference plane so that an intake passage portion formed of the intake pipe and the intake port is smoothly curved.

5. An internal combustion engine of claim 4, wherein exhaust passage means communicating with the exhaust port is formed extending through the cylinder head toward the opposite side of said reference plane, an exhaust gas recirculation passage is arranged to connect the intake pipe to said exhaust passage means, and an exhaust gas recirculation valve is inserted in the exhaust gas recirculation passage.

6. An internal combustion engine of claim 2, wherein an upstream portion of the intake port in the cylinder head curves toward an upper portion of the exhaust port on the opposite side of said reference plane, an exhaust gas recirculation passage is arranged in the cylinder head to connect the intake port to the exhaust port, and an exhaust gas recirculation valve is inserted in the exhaust gas recirculation passage.

7. An internal combustion engine of claim 6, wherein the intake port is wider on a side remote from the cylinder axis than on a side close to the cylinder axis.

8. An internal combustion engine of claim 2, wherein an intake pipe communicating with the intake port is formed extending from an upper wall of the cylinder head toward the opposite side of said reference plane so that an intake passage portion formed of the intake pipe and an upstream side of the intake port is smoothly curved.

9. An internal combustion engine of claim 8, wherein exhaust passage constituting means communicating with the exhaust port is formed extending toward the opposite side of said reference plane through the cylinder head, an exhaust gas recirculation passage is arranged to connect the intake pipe to said exhaust passage constituting means, and an exhaust gas recirculation valve is inserted in the exhaust gas recirculation passage.

10. An internal combustion engine of claim 2, wherein an intake pipe communicating with the intake port is formed extending from an upper wall of the cylinder head toward the opposite side of said reference plane, exhaust passage means communicating with the exhaust port is formed extending toward the opposite side of said reference plane through the cylinder head, an exhaust gas recirculation passage is arranged to connect the intake pipe to said exhaust passage means, and an exhaust gas recirculation valve is inserted in the exhaust gas recirculation passage.

11. An internal combustion engine of claim 10, wherein said internal combustion engine is a multicylinder internal combustion engine and each cylinder is provided individually with the exhaust gas recirculation passage.

12. An internal combustion engine of claim 2, further comprising spark ignition means on the lower wall of the cylinder head, said spark ignition means being arranged centrally in an upper part of the combustion chamber so that said spark ignition means extends along the cylinder axis.

13. An internal combustion engine of claim 12, wherein said fuel injection means is arranged to inject fuel toward the recessed portion formed in the top wall of the piston.

14. An internal combustion engine of claim 13, wherein said fuel injection means is set to perform injection of fuel during a latter part of a compression stroke while the engine is operated under a low load and the engine is set to conduct combustion as lean burn.

15. An internal combustion engine of claim 13, wherein said fuel injection means is set in such a manner that fuel is injected during a latter part of a compression stroke of the engine to conduct combustion as lean burn while the engine is operated under a low load but fuel is injected during an intake stroke of the engine to conduct combustion at a air-fuel ratio higher than that for the lean burn while the engine is operated under a high load.

16. An internal combustion engine of claim 13, wherein the intake port is wider on a side remote from the cylinder axis than on a side close to the cylinder axis and the engine is set to conduct combustion as lean burn.

17. An internal combustion engine of claim 16, wherein an intake pipe communicating with the intake port is formed extending from an upper wall of the cylinder head toward the opposite side of said reference plane so that an intake passage portion formed of the intake pipe and an upstream side of the intake port is smoothly curved.

18. An internal combustion engine of claim 17, wherein exhaust passage constituting means communicating with the exhaust port is formed extending toward the opposite side of said reference plane through the cylinder head, an exhaust gas recirculation passage is arranged to connect the intake pipe to said exhaust passage means, and an exhaust gas recirculation valve is inserted in the exhaust gas recirculation passage.

19. An internal combustion engine of claim 12, wherein the engine is set to conduct combustion as lean burn, and an intake pipe communicating with the intake port is formed extending from an upper wall of the cylinder head toward the opposite side of said reference plane so that an intake passage portion formed of the intake pipe and an upstream side of the intake port is smoothly curved.

20. An internal combustion engine of claim 19, wherein exhaust passage constituting means communicating with the exhaust port is formed extending toward the opposite side of said reference plane through the cylinder head, an exhaust gas recirculation passage is arranged to connect the intake pipe to said exhaust passage means, and an exhaust gas recirculation valve is inserted in the exhaust gas recirculation passage.

21. An internal combustion engine of claim 12, wherein the engine is set to conduct combustion as lean burn, an intake pipe communicating with the intake port is formed extending from an upper wall of the cylinder head toward the opposite side of said reference plane, exhaust passage means communicating with the exhaust port is formed extending toward the opposite side of said reference plane through the cylinder head, an exhaust gas recirculation passage is arranged to connect the intake pipe to said exhaust passage means, and an exhaust gas recirculation valve is inserted in the exhaust gas recirculation passage.

*22. An internal combustion engine of claim 1, wherein the edge portion of the recessed portion extends as an upward gentle slope.*

*23. In an internal combustion engine having:*

*a combustion chamber formed between a top wall of a piston fitted in a cylinder and a lower wall of a cylinder head,*

*an intake port formed through the cylinder head on one side of a reference plane in which a cylinder axis as a central axis of the cylinder is contained, said intake port communicating through an intake opening with the combustion chamber,*

*an exhaust port formed through the cylinder head on an opposite side of the reference plane, said exhaust port communicating through an exhaust opening with the combustion chamber, and*

*open/close valves disposed in the intake port and the exhaust port, respectively, the improvement comprising:*

*the intake port is formed extending upstream from the intake opening substantially along the cylinder axis and is connected at an upstream end thereof to an intake manifold in an upper part of said cylinder head, and*

*the internal combustion engine further comprises fuel injection means disposed in the cylinder head on the one side of the reference plane so that the fuel injection means faces the combustion chamber.*

*24. An internal combustion engine of claim 23, wherein the piston defines a recessed portion in the top wall thereof off-centered toward the one side of the reference plane so that the recessed portion is located opposite the intake port.*

*25. An internal combustion engine of claim 23, wherein the internal combustion engine further comprises an EGR passage for selective communication between the exhaust port and the intake port, and while the engine is operated under a low load, exhaust gas is introduced from the exhaust port into the intake port via the EGR passage in an intake stroke of the engine and said fuel injection means injects fuel into the combustion chamber in a subsequent compression stroke of the engine.*

* * * * *